US011018738B2

(12) United States Patent
Huang et al.

(10) Patent No.: US 11,018,738 B2
(45) Date of Patent: May 25, 2021

(54) COMMUNICATION METHOD, COMMUNICATIONS APPARATUS, AND SYSTEM

(71) Applicant: HUAWEI TECHNOLOGIES CO., LTD., Guangdong (CN)

(72) Inventors: Yi Huang, Shenzhen (CN); Haibao Ren, Shanghai (CN); Yuanjie Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/712,040

(22) Filed: Dec. 12, 2019

(65) Prior Publication Data

US 2020/0119788 A1   Apr. 16, 2020

Related U.S. Application Data

(63) Continuation of application No. PCT/CN2018/091885, filed on Jun. 19, 2018.

(30) Foreign Application Priority Data

Jun. 16, 2017 (CN) .......................... 201710459791.8
Sep. 11, 2017 (CN) .......................... 201710814468.8
Sep. 18, 2017 (CN) .......................... 201710843369.2

(51) Int. Cl.
*H04B 7/0456* (2017.01)
*H04B 7/06* (2006.01)
(Continued)

(52) U.S. Cl.
CPC ......... *H04B 7/0486* (2013.01); *H04B 7/0626* (2013.01); *H04B 7/0639* (2013.01);
(Continued)

(58) Field of Classification Search
None
See application file for complete search history.

(56) References Cited

U.S. PATENT DOCUMENTS 9,344,172 B2 * 5/2016 Nam ..................... H04B 7/0478
9,369,193 B2 * 6/2016 Kim ..................... H04B 7/0617
(Continued)

FOREIGN PATENT DOCUMENTS

CN   104396153 A      3/2015
CN   106233640 A  *  12/2016 ........... H04B 7/0469
(Continued)

OTHER PUBLICATIONS

Ericsson: "Codebook design for Type I single-panel CSI feedback",3GPP Draft; R1-1708687,May 14, 2017 (May 14, 2017), XP051273870,total 20 pages.
(Continued)

*Primary Examiner* — Berhanu Tadese
(74) *Attorney, Agent, or Firm* — Westerman, Hattori, Daniels & Adrian, LLP

(57) ABSTRACT

This application provides a communication method, to provide a codebook of a higher-order precoding matrix, and help increase a quantity of layers of data, thereby helping improve a data transmission capability and improving a throughput. The method includes: receiving, by a first device, a reference signal used for channel measurement; and sending, by the first device, at least one precoding matrix indicator PMI and a rank indication RI based on the reference signal, where the PMI is used to indicate a precoding matrix in a codebook corresponding to the RI, the precoding matrix in the codebook includes a plurality of matrices in a one-to-one correspondence with a plurality of antenna port groups, a matrix corresponding to one antenna port group or each of at least two antenna port groups has two different inter-antenna-port-group phase factors, and
(Continued)

any two column vectors in the precoding matrix are orthogonal to each other.

20 Claims, 5 Drawing Sheets

(51) Int. Cl.
*H04B 7/10* (2017.01)
*H04L 5/00* (2006.01)
*H04L 27/26* (2006.01)
(52) U.S. Cl.
CPC ............ *H04B 7/10* (2013.01); *H04L 5/0048* (2013.01); *H04L 27/2634* (2013.01)

(56) References Cited

U.S. PATENT DOCUMENTS

| | | | | |
|---|---|---|---|---|
| 10,326,512 | B2* | 6/2019 | Li | H04B 7/0469 |
| 10,536,205 | B2* | 1/2020 | Rahman | H04B 7/0417 |
| 10,547,368 | B2* | 1/2020 | Rahman | H04B 7/0478 |
| 10,587,322 | B2* | 3/2020 | Liu | H04B 7/0478 |
| 10,644,767 | B2* | 5/2020 | Gao | H04B 7/0456 |
| 10,686,509 | B2* | 6/2020 | Rahman | H04B 7/0408 |
| 2013/0058424 | A1 | 3/2013 | Enescu et al. | |
| 2015/0236773 | A1* | 8/2015 | Kim | H04B 7/0452 375/295 |
| 2016/0119097 | A1 | 4/2016 | Nam et al. | |
| 2017/0117943 | A1 | 4/2017 | Rahman et al. | |
| 2017/0150480 | A1* | 5/2017 | Kim | H04W 8/005 |
| 2018/0234148 | A1* | 8/2018 | Li | H04B 7/065 |
| 2018/0254816 | A1* | 9/2018 | Liu | H04B 7/0626 |
| 2018/0316407 | A1* | 11/2018 | Rahman | H04B 7/0478 |
| 2018/0367202 | A1* | 12/2018 | Yang | H04L 1/0071 |
| 2018/0368083 | A1* | 12/2018 | Yang | H04W 52/146 |
| 2019/0068267 | A1* | 2/2019 | Rahman | H04B 7/0408 |
| 2019/0074884 | A1* | 3/2019 | Chen | H04B 7/0632 |
| 2019/0081679 | A1* | 3/2019 | Davydov | H04L 5/0094 |
| 2019/0181925 | A1* | 6/2019 | Kang | H04B 7/0617 |
| 2019/0199420 | A1* | 6/2019 | Faxer | H04B 7/0639 |
| 2019/0229786 | A1* | 7/2019 | Huang | H04B 7/0478 |
| 2019/0245608 | A1* | 8/2019 | Kakishima | H04B 7/0456 |
| 2019/0296814 | A1* | 9/2019 | Kakishima | H04B 7/0417 |
| 2019/0312615 | A1* | 10/2019 | Wu | H04B 7/0417 |
| 2019/0319758 | A1* | 10/2019 | Yum | H04B 7/0626 |
| 2019/0326973 | A1* | 10/2019 | Kim | H04L 5/0023 |
| 2019/0335399 | A1* | 10/2019 | Wang | H04L 5/0051 |
| 2019/0341979 | A1* | 11/2019 | Gao | H04L 1/00 |
| 2020/0007205 | A1* | 1/2020 | Park | H04B 7/0486 |
| 2020/0053721 | A1* | 2/2020 | Cheng | H04B 7/086 |
| 2020/0083943 | A1* | 3/2020 | Rahman | H04B 7/0639 |
| 2020/0091981 | A1* | 3/2020 | Rahman | H04B 7/0478 |
| 2020/0091982 | A1* | 3/2020 | Rahman | H04B 7/0478 |
| 2020/0091983 | A1* | 3/2020 | Rahman | H04B 7/0639 |
| 2020/0107341 | A1* | 4/2020 | Zhang | H04W 72/042 |
| 2020/0119788 | A1* | 4/2020 | Huang | H04B 7/0469 |
| 2020/0119793 | A1* | 4/2020 | Rahman | H04B 7/0626 |
| 2020/0127721 | A1* | 4/2020 | Li | H04B 7/0626 |
| 2020/0136702 | A1* | 4/2020 | Rahman | H04B 7/0473 |
| 2020/0177254 | A1* | 6/2020 | Lee | H04W 56/0045 |
| 2020/0177416 | A1* | 6/2020 | Jiang | H04B 7/0413 |
| 2020/0186207 | A1* | 6/2020 | Davydov | H04B 7/0417 |
| 2020/0195319 | A1* | 6/2020 | Park | H04L 1/1614 |

FOREIGN PATENT DOCUMENTS

| | | | | |
|---|---|---|---|---|
| CN | 106233640 | A | 12/2016 | |
| CN | 106559121 | A | 4/2017 | |
| CN | 109150256 | A * | 1/2019 | ........... H04B 7/0486 |
| CN | 110535589 | A * | 12/2019 | ............... H04L 5/00 |
| EP | 3602835 | A4 * | 4/2020 | ........... H04B 7/0482 |
| WO | 2017080132 | A1 | 5/2017 | |
| WO | 2018199625 | A1 | 11/2018 | |
| WO | WO-2018228599 | A1 * | 12/2018 | ........... H04B 7/0456 |

OTHER PUBLICATIONS

Huawei et al,Design and evaluation results for Type I codebook,3GPP TSG RAN WG1 Meeting #89,R1-1708138, Hangzhou, China, May 15-19, 2017, total 11 pages.

3GPP TS 36.213 V14.0.0 (Sep. 2016),3rd Generation Partnership Project;Technical Specification Group Radio Access Network;Evolved Universal Terrestrial Radio Access (E-UTRA);Physical layer procedures(Release 14), total 406 pages.

Samsung et al: "HF on Type 1 and II CSI codebooks",3GPP Draft; R1-1709232,May 17, 2017 (May 17, 2017), XP051285064,total 24 pages.

InterDigital Communications,"On CSI feedback for NR",3GPP TSG RAN WG1 Meeting #86,R1-167572,Gothenburg, Sweden Aug. 22-26, 2016, total 5 pages.

Extended (Supplementary) European Search Report dated Apr. 23, 2020, issued in counterpart EP Application No. 18818772.8. (10 pages).

International Search Report dated Sep. 4, 2018, issued in counterpart Application No. PCT/CN2018/091885, with English Translation. (12 pages).

Office Action dated Mar. 18, 2021, issued in counterpart EP Application No. 18 818 772.8. (6 pages).

* cited by examiner

COMMUNICATION METHOD, COMMUNICATIONS APPARATUS, AND SYSTEM

CROSS-REFERENCE TO RELATED APPLICATIONS

This application is a continuation of International Application No. PCT/CN2018/091885, filed on Jun. 19, 2018, which claims priority to Chinese Patent Application No. 201710459791.8, filed on Jun. 16, 2017, Chinese Patent Application No. 201710814468.8, filed on Sep. 11, 2017, and Chinese Patent Application No. 201710843369.2, filed on Sep. 18, 2017. The disclosures of the aforementioned applications are hereby incorporated by reference in their entireties.

BACKGROUND

Massive multiple-input multiple-output (massive multiple-input multiple-output, Massive MIMO) is one of industry-accepted key technologies of the 5th generation mobile communications (the 5th Generation mobile communication, 5G). To avoid interference among a plurality of users and improve signal quality, a signal may be usually processed through precoding, thereby implementing spatial multiplexing, and greatly improving spectrum utilization.

In the prior art, a network device may send, for example, a channel state information-reference signal (channel state information reference signal, CSI-RS), to obtain channel state information (channel state information) fed back by a terminal device, and further determine a precoding matrix that adapts to a downlink channel. A quantity of rows of the precoding matrix may represent a quantity of antenna ports, and a quantity of columns of the precoding matrix may represent a rank (rank) corresponding to the codebook.

However, in a new radio access technology (new radio access technology, NR) of 5G, with development of a multiple-antenna technology, a quantity of antenna ports increases. A plurality of antenna panels may be configured for a same network device owing to an increase in the quantity of antenna ports, to configure a plurality of antenna ports on the plurality of antenna panels. Therefore, a multi-panel codebook (multi-panel codebook) is introduced.

In the prior art, there is still no method for providing a higher-order (for example, a rank is greater than 4) codebook to achieve orthogonality between column vectors in a precoding matrix.

SUMMARY

This application provides a communication method, a communications apparatus, and a system, to provide a higher-order codebook.

According to a first aspect, a communication method is provided. The method includes:

receiving, by a first device, a reference signal used for channel measurement; and sending, by the first device, at least one precoding matrix indicator (precoding matrix indicator, PMI) and a rank indication (rank indication, RI) based on the reference signal, where the PMI is used to indicate a precoding matrix in a codebook corresponding to the RI, the precoding matrix in the codebook includes a plurality of matrices in a one-to-one correspondence with a plurality of antenna port groups, a matrix corresponding to one antenna port group or each of at least two antenna port groups has two different inter-antenna-port-group phase factors, and any two column vectors in the precoding matrix are orthogonal to each other.

In this application, a precoding matrix used for a high-order codebook is provided, so that any two precoding column vectors in the precoding matrix are orthogonal to each other. Therefore, a data stream can be transmitted on a larger quantity of layers, thereby helping improve a rate of MIMO transmission, improving a data transmission capability of a communications system, and improving a throughput.

Optionally, the method further includes:

sending, by the second device, codebook indication information to the first device, where the codebook indication information is used to indicate a used codebook type.

Optionally, the codebook type includes a single-panel codebook or a multi-panel codebook.

Therefore, after receiving the codebook indication information, the first device may select a corresponding codebook based on the indicated codebook type.

Optionally, the method further includes:

receiving, by the first device, a codebook configuration parameter.

Optionally, the codebook configuration parameter includes any one of the following:

a quantity of antenna port groups and a quantity of antenna ports included in each antenna port group;

a quantity of antenna port groups and a total quantity of antenna ports;

a total quantity of antenna ports and a quantity of antenna ports included in each antenna port group; or a quantity of horizontal antenna ports included in each antenna port group and a quantity of vertical antenna ports included in each antenna port group and a quantity of antenna port groups.

A vector length of the precoding matrix, namely, a quantity of rows of the precoding matrix, can be determined by indicating the codebook configuration parameter.

In addition, the first device may determine a channel matrix based on the reference signal, to determine a rank. Therefore, a quantity of columns of the precoding matrix can be determined.

According to a second aspect, a communication method is provided. The method includes:

sending, by a second device, a reference signal used for channel measurement; and receiving, by the second device, at least one PMI and an RI, where the PMI and the RI are related to the reference signal, the PMI is used to indicate a precoding matrix in a codebook corresponding to the RI, the precoding matrix in the codebook includes a plurality of matrices in a one-to-one correspondence with a plurality of antenna port groups, a matrix corresponding to one antenna port group or each of at least two antenna port groups has two different inter-antenna-port-group phase factors, and any two column vectors in the precoding matrix are orthogonal to each other. In this application, a precoding matrix used for a high-order codebook is provided, so that any two precoding column vectors in the precoding matrix are orthogonal to each other. Therefore, a data stream can be transmitted on a larger quantity of layers, thereby helping improve a rate of MIMO transmission, improving a data transmission capability of a communications system, and improving a throughput.

Optionally, the method further includes:

sending, by the second device, codebook indication information to a first device, where the codebook indication information is used to indicate a used codebook type.

Optionally, the codebook type includes a single-panel codebook or a multi-panel codebook.

Therefore, after receiving the codebook indication information, the first device may select a corresponding codebook based on the indicated codebook type.

Optionally, the method further includes:

receiving, by the first device, a codebook configuration parameter. Optionally, the codebook configuration parameter includes any one of the following:

a quantity of antenna port groups and a quantity of antenna ports included in each antenna port group;

a quantity of antenna port groups and a total quantity of antenna ports;

a total quantity of antenna ports and a quantity of antenna ports included in each antenna port group; or a quantity of horizontal antenna ports included in each antenna port group and a quantity of vertical antenna ports included in each antenna port group and a quantity of antenna port groups.

A vector length of the precoding matrix, namely, a quantity of rows of the precoding matrix, can be determined by indicating the codebook configuration parameter.

In addition, the first device may determine a channel matrix based on the reference signal, to determine a rank. Therefore, a quantity of columns of the precoding matrix can be determined.

Corresponding to the communication method according to the first aspect, this application further provides a communications apparatus. The communications apparatus may be any transmit-end device or receive-end device that transmits data wirelessly. For example, the communications apparatus may be a communications chip, a terminal device, or a network device (for example, a base station). In a communication process, a transmit-end device is relative to a receive-end device. In some communication processes, the communications apparatus may serve as the foregoing first device, and in some communication processes, the communications apparatus may serve as the foregoing second device. For example, for downlink data transmission, a transmit-end device is a base station, and a corresponding receive-end device is a terminal device. For uplink data transmission, a transmit-end device is a terminal device, and a corresponding receive-end device is a base station. For D2D (device to device) data transmission, a transmit-end device is a terminal device, and a corresponding receive-end device may also be a terminal device. A communication mode is not limited in this application.

The reference signal may be a reference signal used for uplink channel measurement, a reference signal used for downlink channel measurement, or a reference signal used for another communication mode. For example, if the reference signal is a reference signal used for uplink channel measurement, the first device may be a terminal device or a communications chip applicable to a terminal device, and the second device is a network device or a communications chip applicable to a network device. For another example, if the reference signal is a reference signal used for downlink channel measurement, the first device may be a network device or a communications chip applicable to a network device, and the second device may be a terminal device or a communications chip applicable to a terminal device.

According to a third aspect, a communications apparatus is provided. The communications apparatus includes a sending unit and a receiving unit, to perform the method according to any one of the possible implementations of the first aspect or the second aspect. The sending unit is configured to perform a function related to sending, and the receiving unit is configured to perform a function related to receiving.

In a design, the communications apparatus is a communications chip, the receiving unit may be an input circuit or interface of the communications chip, and the sending unit may be an output circuit or interface of the communications chip.

In another design, the communications apparatus is a terminal device, and the sending unit may be a transmitter or a transmitting device.

In another design, the communications apparatus is a network device, and the sending unit may be a receiver or a receiving device.

Optionally, the communications apparatus further includes modules that may be configured to perform the communication method according to any one of the possible implementations of the first aspect or the second aspect.

According to a fourth aspect, a communications apparatus is provided. The communications apparatus includes a processor and a memory. The memory is configured to store a computer program, and the processor is configured to invoke the computer program from the memory and run the computer program, to enable the communications apparatus to perform the method according to any one of the possible implementations of the first aspect or the second aspect.

Optionally, there is one or more processors, and there is one or more memories.

Optionally, the memory may be integrated with the processor, or the memory and the processor may be disposed separately.

Optionally, the communications apparatus further includes a transmitter (a transmitter) and a receiver (a receiver).

In a possible design, a terminal device is provided. The terminal device includes a transceiver, a processor, and a memory. The processor is configured to control the transceiver to receive and send a signal. The memory is configured to store a computer program, and the processor is configured to invoke the computer program from the memory and run the computer program, to enable the terminal device to perform the method according to any one of the first aspect or the possible implementations of the first aspect.

In another possible design, a network device is provided. The network device includes a transceiver, a processor, and a memory. The processor is configured to control the transceiver to receive and send a signal. The memory is configured to store a computer program, and the processor is configured to invoke the computer program from the memory and run the computer program, to enable the network device to perform the method according to any one of the second aspect or the possible implementations of the second aspect.

According to a fifth aspect, a system is provided. The system includes the foregoing terminal device and the foregoing network device.

According to a sixth aspect, a computer program product is provided. The computer program product includes a computer program (which may also be referred to as code or an instruction). When the computer program is run, a computer is enabled to perform the method according to any one of the possible implementations of the first aspect or the second aspect.

According to a seventh aspect, a computer-readable medium is provided. The computer-readable medium stores a computer program (which may also be referred to as code or an instruction), and when the computer program is run on a computer, the computer is enabled to perform the method according to any one of the possible implementations of the first aspect or the second aspect.

In any one of the foregoing aspects:

Optionally, the quantity of columns of the precoding matrix corresponds to the rank, and the quantity of rows of the precoding matrix corresponds to the total quantity of antenna ports. The rank is M, the quantity of antenna port groups is N, matrices that correspond to N/2 antenna port groups and that are in the precoding matrix include a first column vector set and a second column vector set, and an inter-antenna-port-group phase factor of the first column vector set and an inter-antenna-port-group phase factor of $$W_1 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \end{bmatrix};$$

the second column vector set are opposite numbers, where M is an integer greater than 1, and N is an even number greater than or equal to 2.

Optionally, each antenna port group (where for example, each antenna panel corresponds to one antenna port group) includes $2N_1N_2$ CSI-RS antenna ports, $N_1$ represents a quantity of horizontal CSI-RS antenna ports, $N_2$ represents a quantity of vertical CSI-RS antenna ports, and the total quantity of antenna ports included in the N antenna port groups is $P_{CSI-RS}=2\underline{N}N_1N_2$, where N is an even number greater than or equal to 2, $N_1$ is an integer greater than or equal to 1, $N_2$ is an integer greater than or equal to 1, and $\underline{N}$ is N.

The precoding matrix provides a possible form for a codebook whose order is 8.

In a possible design, M is 8, N is 2, and the precoding matrix in the codebook corresponding to the rank is or satisfies:

$$W_1 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \end{bmatrix};$$

or a matrix having a row and/or column transformation relationship with $W_1$; or a product of $W_1$ and a constant coefficient, where for example, the constant coefficient may be $$\frac{1}{\sqrt{M \cdot P_{CSI-RS}}};$$

or a product of a constant coefficient and a matrix having a row and/or column transformation relationship with $W_1$, where for example, the constant coefficient may be $$\frac{1}{\sqrt{M \cdot P_{CSI-RS}}},$$

where $b_1$ and $b_2$ are discrete Fourier transform DFT vectors, c is a polarization antenna phase factor, $\varphi_{11}$ and $\varphi_{12}$ are two inter-antenna-port-group phase factors corresponding to one antenna port group, and $\varphi_{11}=-\varphi_{12}$.

In a possible design, M<8, N is 2, and the precoding matrix in the codebook corresponding to the rank includes M column vectors, where the M column vectors are a subset of column vectors in the following precoding matrix or a precoding matrix satisfying the following equation:

a matrix having a row and/or column transformation relationship with $W_1$; or a product of $W_1$ and a constant coefficient, where for example, the constant coefficient may be $$\frac{1}{\sqrt{M \cdot P_{CSI-RS}}};$$

or a product of a constant coefficient and a matrix having a row and/or column transformation relationship with $W_1$, where for example, the constant coefficient may be $$\frac{1}{\sqrt{M \cdot P_{CSI-RS}}},$$

where $b_1$ and $b_2$ are discrete Fourier transform DFT vectors, c is a polarization antenna phase factor, $\varphi_{11}$ and $\varphi_{12}$ are two inter-antenna-port-group phase factors corresponding to one antenna port group, and $\varphi_{11}=-\varphi_{12}$.

The precoding matrix provides a possible form for a codebook whose order is 5 to 7.

That is, a precoding matrix in a codebook corresponding to a maximum value of the rank may be nested.

In a possible design, M is 8, N is 4, and the precoding matrix in the codebook corresponding to the rank is or satisfies:

$$W_2 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \\ \varphi_{21}\begin{pmatrix} b_1 \\ c \cdot b_1 \end{pmatrix} & \varphi_{21}\begin{pmatrix} b_1 \\ -c \cdot b_1 \end{pmatrix} & \varphi_{21}\begin{pmatrix} b_2 \\ c \cdot b_2 \end{pmatrix} & \varphi_{21}\begin{pmatrix} b_2 \\ -c \cdot b_2 \end{pmatrix} & \varphi_{22}\begin{pmatrix} b_1 \\ c \cdot b_1 \end{pmatrix} & \varphi_{22}\begin{pmatrix} b_1 \\ -c \cdot b_1 \end{pmatrix} & \varphi_{22}\begin{pmatrix} b_2 \\ c \cdot b_2 \end{pmatrix} & \varphi_{22}\begin{pmatrix} b_2 \\ -c \cdot b_2 \end{pmatrix} \\ \varphi_{31}\begin{pmatrix} b_1 \\ c \cdot b_1 \end{pmatrix} & \varphi_{31}\begin{pmatrix} b_1 \\ -c \cdot b_1 \end{pmatrix} & \varphi_{31}\begin{pmatrix} b_2 \\ c \cdot b_2 \end{pmatrix} & \varphi_{31}\begin{pmatrix} b_2 \\ -c \cdot b_2 \end{pmatrix} & \varphi_{32}\begin{pmatrix} b_1 \\ c \cdot b_1 \end{pmatrix} & \varphi_{32}\begin{pmatrix} b_1 \\ -c \cdot b_1 \end{pmatrix} & \varphi_{32}\begin{pmatrix} b_2 \\ c \cdot b_2 \end{pmatrix} & \varphi_{32}\begin{pmatrix} b_2 \\ -c \cdot b_2 \end{pmatrix} \end{bmatrix} ; \text{ or}$$

a matrix having a row and/or column transformation relationship with $W_2$; or a product of $W_2$ and a constant coefficient, where for example, the constant coefficient may be $$\frac{1}{\sqrt{M \cdot P_{CSI-RS}}};$$

or a product of a constant coefficient and a matrix having a row and/or column transformation relationship with $W_2$, where for example, the constant coefficient may be $$\frac{1}{\sqrt{M \cdot P_{CSI-RS}}},$$

where $b_1$ and $b_2$ are DFT vectors, c is a polarization antenna phase factor, $\varphi_{11}$ and $\varphi_{12}$, $\varphi_{21}$ and $\varphi_{22}$, and $\varphi_{31}$ and $\varphi_{32}$ are three groups of inter-antenna-port-group phase factors in a one-to-one correspondence with three antenna port groups, values of two groups of inter-antenna-port-group phase factors satisfy $\varphi_{i1}=-\varphi_{i2}$, and values of the other group of inter-antenna-port-group phase factors satisfy $\varphi_{i1}=\varphi_{i2}$, where i is 1, 2, or 3.

The precoding matrix provides another possible form for the codebook whose order is 8.

In a possible design, M is 8, N is 4, and the precoding matrix in the codebook corresponding to the rank is or satisfies:

$$W_2' = \begin{bmatrix} b_1 & b_1 & b_2 & b_2 & \alpha_{11}\begin{pmatrix} b_1 \\ c \cdot b_1 \end{pmatrix} & \alpha_{21}\begin{pmatrix} b_1 \\ -c \cdot b_1 \end{pmatrix} & \beta_{11}\begin{pmatrix} b_2 \\ c \cdot b_2 \end{pmatrix} & \beta_{21}\begin{pmatrix} b_2 \\ -c \cdot b_2 \end{pmatrix} \\ c \cdot b_1 & -c \cdot b_1 & c \cdot b_2 & -c \cdot b_2 & & & & \\ b_1 & b_1 & b_2 & b_2 & \alpha_{12}\begin{pmatrix} b_1 \\ c \cdot b_1 \end{pmatrix} & \alpha_{22}\begin{pmatrix} b_1 \\ -c \cdot b_1 \end{pmatrix} & \beta_{12}\begin{pmatrix} b_2 \\ c \cdot b_2 \end{pmatrix} & \beta_{22}\begin{pmatrix} b_2 \\ -c \cdot b_2 \end{pmatrix} \\ c \cdot b_1 & -c \cdot b_1 & c \cdot b_2 & -c \cdot b_2 & & & & \\ b_1 & b_1 & b_2 & b_2 & \alpha_{13}\begin{pmatrix} b_1 \\ c \cdot b_1 \end{pmatrix} & \alpha_{23}\begin{pmatrix} b_1 \\ -c \cdot b_1 \end{pmatrix} & \beta_{13}\begin{pmatrix} b_2 \\ c \cdot b_2 \end{pmatrix} & \beta_{23}\begin{pmatrix} b_2 \\ -c \cdot b_2 \end{pmatrix} \\ c \cdot b_1 & -c \cdot b_1 & c \cdot b_2 & -c \cdot b_2 & & & & \\ b_1 & b_1 & b_2 & b_2 & \alpha_{14}\begin{pmatrix} b_1 \\ c \cdot b_1 \end{pmatrix} & \alpha_{24}\begin{pmatrix} b_1 \\ -c \cdot b_1 \end{pmatrix} & \beta_{14}\begin{pmatrix} b_2 \\ c \cdot b_2 \end{pmatrix} & \beta_{24}\begin{pmatrix} b_2 \\ -c \cdot b_2 \end{pmatrix} \\ c \cdot b_1 & -c \cdot b_1 & c \cdot b_2 & -c \cdot b_2 & & & & \end{bmatrix};$$

or a matrix having a row and/or column transformation relationship with $W_2'$; or a product of $W_2'$ and a constant coefficient, where for example, the constant coefficient may be $$\frac{1}{\sqrt{M \cdot P_{CSI-RS}}};$$

or a product of a constant coefficient and a matrix having a row and/or column transformation relationship with $W_2'$, where for example, the constant coefficient may be $$\frac{1}{\sqrt{M \cdot P_{CSI-RS}}},$$

where $b_1$ and $b_2$ are discrete Fourier transform DFT vectors, and c is a polarization antenna phase factor;

values of two of $\alpha_{11}$, $\alpha_{12}$, $\alpha_{13}$, and $\alpha_{14}$ are +1, and values of the other two are −1;

values of two of $\alpha_{21}$, $\alpha_{22}$, $\alpha_{23}$, and $\alpha_{24}$ are +1, and values of the other two are −1;

values of two of $\beta_{11}$, $\beta_{12}$, $\beta_{13}$, and $\beta_{14}$ are +1, and values of the other two are −1;

values of two of $\beta_{21}$, $\beta_{22}$, $\beta_{23}$, and $\beta_{24}$ are +1, and values of the other two are −1; and two parameters with a value of 1 and two parameters with a value of −1 may be defined in a protocol, and pre-stored in a corresponding apparatus, or may be configured for the terminal device by using the network device.

The precoding matrix provides still another possible form for the codebook whose order is 8.

In a possible design, M<8, N is 4, and the precoding matrix in the codebook corresponding to the rank includes M column vectors, where the M column vectors are a subset of column vectors in the following precoding matrix or a precoding matrix satisfying the following equation:

$$W_2 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \\ \varphi_{21}\begin{pmatrix} b_1 \\ c \cdot b_1 \end{pmatrix} & \varphi_{21}\begin{pmatrix} b_1 \\ -c \cdot b_1 \end{pmatrix} & \varphi_{21}\begin{pmatrix} b_2 \\ c \cdot b_2 \end{pmatrix} & \varphi_{21}\begin{pmatrix} b_2 \\ -c \cdot b_2 \end{pmatrix} & \varphi_{22}\begin{pmatrix} b_1 \\ c \cdot b_1 \end{pmatrix} & \varphi_{22}\begin{pmatrix} b_1 \\ -c \cdot b_1 \end{pmatrix} & \varphi_{22}\begin{pmatrix} b_2 \\ c \cdot b_2 \end{pmatrix} & \varphi_{22}\begin{pmatrix} b_2 \\ -c \cdot b_2 \end{pmatrix} \\ \varphi_{31}\begin{pmatrix} b_1 \\ c \cdot b_1 \end{pmatrix} & \varphi_{31}\begin{pmatrix} b_1 \\ -c \cdot b_1 \end{pmatrix} & \varphi_{31}\begin{pmatrix} b_2 \\ c \cdot b_2 \end{pmatrix} & \varphi_{31}\begin{pmatrix} b_2 \\ -c \cdot b_2 \end{pmatrix} & \varphi_{32}\begin{pmatrix} b_1 \\ c \cdot b_1 \end{pmatrix} & \varphi_{32}\begin{pmatrix} b_1 \\ -c \cdot b_1 \end{pmatrix} & \varphi_{32}\begin{pmatrix} b_2 \\ c \cdot b_2 \end{pmatrix} & \varphi_{32}\begin{pmatrix} b_2 \\ -c \cdot b_2 \end{pmatrix} \end{bmatrix}; \text{ or}$$

a matrix having a row and/or column transformation relationship with $W_2$; or a product of $W_2$ and a constant coefficient, where for example, the constant coefficient may be $$\frac{1}{\sqrt{M \cdot P_{CSI-RS}}};$$

or a product of a constant coefficient and a matrix having a row and/or column transformation relationship with $W_2$, where for example, the constant coefficient may be $$\frac{1}{\sqrt{M \cdot P_{CSI-RS}}},$$

where $b_1$ and $b_2$ are DFT vectors, c is a polarization antenna phase factor, $\varphi_{11}$ and $\varphi_{12}$, $\varphi_{21}$ and $\varphi_{22}$, and $\varphi_{31}$ and $\varphi_{32}$ are three groups of inter-antenna-port-group phase factors in a one-to-one correspondence with three antenna port groups, values of two groups of inter-antenna-port-group phase factors satisfy $\varphi_{i1} = -\varphi_{i2}$, and values of the other group of inter-antenna-port-group phase factors satisfy $\varphi_{i1} = \varphi_{i2}$, where i is 1, 2, or 3.

The precoding matrix provides another possible form for the codebook whose order is 5 to 7.

In a possible design, M=4, N=2, and when a codebook mode is a codebook mode 1, the precoding matrix in the codebook corresponding to the rank is or satisfies:

$$W_8 = \begin{bmatrix} 1 & 1 & 1 & 1 \\ \varphi_n & -\varphi_n & \varphi_n & -\varphi_n \\ \varphi_{p_1} & \varphi_{p_1} & -\varphi_{p_1} & -\varphi_{p_1} \\ \varphi_n\varphi_{p_1} & -\varphi_n\varphi_{p_1} & \varphi_n(-\varphi_{p_1}) & -\varphi_n(-\varphi_{p_1}) \end{bmatrix}$$

$$= \begin{bmatrix} 1 & 1 & 1 & 1 \\ \varphi_n & -\varphi_n & \varphi_n & -\varphi_n \\ \varphi_{p_1} & \varphi_{p_1} & -\varphi_{p_1} & -\varphi_{p_1} \\ \varphi_n\varphi_{p_1} & -\varphi_n\varphi_{p_1} & -\varphi_n\varphi_{p_1} & \varphi_n\varphi_{p_1} \end{bmatrix};$$

or a matrix having a row and/or column transformation relationship with $W_8$; or a product of $W_8$ and a constant coefficient, where for example, the constant coefficient may be $$\frac{1}{\sqrt{M \cdot P_{CSI-RS}}};$$

or a product of a constant coefficient and a matrix having a row and/or column transformation relationship with $W_8$, where for example, the constant coefficient may be $$\frac{1}{\sqrt{M \cdot P_{CSI-RS}}},$$

where an equation after the first equal sign is used for description. $\varphi_n = e^{j\pi n/2}$ is a polarization antenna phase factor, and may be a value in $\{+1, -1, +j, -j\}$, a value of n is in $\{0, 1, 2, 3\}$, $\varphi_{p_1} = e^{j\pi p_1/2}$ and $-\varphi_{p_1}$ are inter-antenna-port-group phase factors, $\varphi_{p_1}$ may be a value in $\{+1, -1, +j, -j\}$, and a value of $p_1$ is in $\{0, 1, 2, 3\}$.

The precoding matrix provides a possible form for a codebook whose order is 4.

In a possible design, M=3, N=2, and when a codebook mode is a codebook mode 1, the precoding matrix in the codebook corresponding to the rank includes three column vectors, where the three column vectors are a subset of column vectors in the following precoding matrix or a precoding matrix satisfying the following equation:

$$W_8 = \begin{bmatrix} 1 & 1 & 1 & 1 \\ \varphi_n & -\varphi_n & \varphi_n & -\varphi_n \\ \varphi_{p_1} & \varphi_{p_1} & -\varphi_{p_1} & -\varphi_{p_1} \\ \varphi_n\varphi_{p_1} & -\varphi_n\varphi_{p_1} & \varphi_n(-\varphi_{p_1}) & -\varphi_n(-\varphi_{p_1}) \end{bmatrix}$$

$$= \begin{bmatrix} 1 & 1 & 1 & 1 \\ \varphi_n & -\varphi_n & \varphi_n & -\varphi_n \\ \varphi_{p_1} & \varphi_{p_1} & -\varphi_{p_1} & -\varphi_{p_1} \\ \varphi_n\varphi_{p_1} & -\varphi_n\varphi_{p_1} & -\varphi_n\varphi_{p_1} & \varphi_n\varphi_{p_1} \end{bmatrix};$$

or a matrix having a row and/or column transformation relationship with $W_8$; or a product of $W_8$ and a constant coefficient, where for example, the constant coefficient may be $$\frac{1}{\sqrt{M \cdot P_{CSI-RS}}};$$

or a product of a constant coefficient and a matrix having a row and/or column transformation relationship with $W_8$, where for example, the constant coefficient may be $$\frac{1}{\sqrt{M \cdot P_{CSI\text{-}RS}}},$$

where an equation after the first equal sign is used for description. $\varphi_n = e^{j\pi n/2}$ is a polarization antenna phase factor, and may be a value in $\{+1, -1, +j, -j\}$, a value of n is in $\{0, 1, 2, 3\}$, $\varphi_{p_1} = e^{j\pi p_1/2}$ and $-\varphi_{p_1}$ are inter-antenna-port-group phase factors, $\varphi_{p_1}$ may be a value in $\{+1, -1, +j, -j\}$, and a value of $p_1$ is in $\{0, 1, 2, 3\}$.

The precoding matrix provides a possible form for a codebook whose order is 3.

In a possible design, M=4, N=4, and when a codebook mode is a codebook mode 1, the precoding matrix in the codebook corresponding to the rank is or satisfies:

$$W_{10} = \begin{bmatrix} 1 & 1 & 1 & 1 \\ \varphi_n & -\varphi_n & \varphi_n & -\varphi_n \\ \varphi_{p_1} & \varphi_{p_1} & \varphi_{p_1} & \varphi_{p_1} \\ \varphi_{p_1}\varphi_n & \varphi_{p_1}(-\varphi_n) & \varphi_{p_1}\varphi_n & \varphi_{p_1}(-\varphi_n) \\ \varphi_{p_2} & \varphi_{p_2} & -\varphi_{p_2} & -\varphi_{p_2} \\ \varphi_{p_2}\varphi_n & \varphi_{p_2}(-\varphi_n) & (-\varphi_{p_2})\varphi_n & (-\varphi_{p_2})(-\varphi_n) \\ \varphi_{p_3} & \varphi_{p_3} & -\varphi_{p_3} & -\varphi_{p_3} \\ \varphi_{p_3}\varphi_n & \varphi_{p_3}(-\varphi_n) & (-\varphi_{p_3})\varphi_n & (-\varphi_{p_3})(-\varphi_n) \end{bmatrix} =$$

$$\begin{bmatrix} 1 & 1 & 1 & 1 \\ \varphi_n & -\varphi_n & \varphi_n & -\varphi_n \\ \varphi_{p_1} & \varphi_{p_1} & \varphi_{p_1} & \varphi_{p_1} \\ \varphi_{p_1}\varphi_n & -\varphi_{p_1}\varphi_n & \varphi_{p_1}\varphi_n & -\varphi_{p_1}\varphi_n \\ \varphi_{p_2} & \varphi_{p_2} & -\varphi_{p_2} & -\varphi_{p_2} \\ \varphi_{p_2}\varphi_n & -\varphi_{p_2}\varphi_n & -\varphi_{p_2}\varphi_n & \varphi_{p_2}\varphi_n \\ \varphi_{p_3} & \varphi_{p_3} & -\varphi_{p_3} & -\varphi_{p_3} \\ \varphi_{p_3}\varphi_n & -\varphi_{p_3}\varphi_n & -\varphi_{p_3}\varphi_n & \varphi_{p_3}\varphi_n \end{bmatrix} ; \text{ or}$$

a matrix having a row and/or column transformation relationship with $W_{10}$; or a product of $W_{10}$ and a constant coefficient, where for example, the constant coefficient may be $$\frac{1}{\sqrt{M \cdot P_{CSI\text{-}RS}}};$$

or a product of a constant coefficient and a matrix having a row and/or column transformation relationship with $W_{10}$, where for example, the constant coefficient may be $$\frac{1}{\sqrt{M \cdot P_{CSI\text{-}RS}}},$$

where an equation after the first equal sign is used for description. $\varphi_n = e^{j\pi n/2}$ is a polarization antenna phase factor, and may be a value in $\{+1, -1, +j, -j\}$, a value of n is in $\{0, 1, 2, 3\}$, $\varphi_{p_1} = e^{j\pi p_1/2}$ is an inter-antenna-port-group phase factor, $\varphi_{p_1}$ may be a value in $\{+1, -1, +j, -j\}$, a value of $p_1$ is in $\{0, 1, 2, 3\}$, $\varphi_{p_2} = e^{j\pi p_2/2}$ is an inter-antenna-port-group phase factor, $-\varphi_{p_2}$ is an inter-antenna-port-group phase factor, $\varphi_{p_2}$ may be a value in $\{+1, -1, +j, -j\}$, a value of $p_2$ is in $\{0, 1, 2, 3\}$, $\varphi_{p_3} = e^{j\pi p_3/2}$ is an inter-antenna-port-group phase factor, $-\varphi_{p_3}$ is an inter-antenna-port-group phase factor, $\varphi_{p_3}$ may be a value in $\{+1, -1, +j, -j\}$, and a value of $p_3$ is in $\{0, 1, 2, 3\}$.

In a possible design, M=3, N=4, and when a codebook mode is a codebook mode 1, the precoding matrix in the codebook corresponding to the rank includes three column vectors, where the three column vectors are a subset of column vectors in the following precoding matrix or a precoding matrix satisfying the following equation:

$$W_{10} = \begin{bmatrix} 1 & 1 & 1 & 1 \\ \varphi_n & -\varphi_n & \varphi_n & -\varphi_n \\ \varphi_{p_1} & \varphi_{p_1} & \varphi_{p_1} & \varphi_{p_1} \\ \varphi_{p_1}\varphi_n & \varphi_{p_1}(-\varphi_n) & \varphi_{p_1}\varphi_n & \varphi_{p_1}(-\varphi_n) \\ \varphi_{p_2} & \varphi_{p_2} & -\varphi_{p_2} & -\varphi_{p_2} \\ \varphi_{p_2}\varphi_n & \varphi_{p_2}(-\varphi_n) & (-\varphi_{p_2})\varphi_n & (-\varphi_{p_2})(-\varphi_n) \\ \varphi_{p_3} & \varphi_{p_3} & -\varphi_{p_3} & -\varphi_{p_3} \\ \varphi_{p_3}\varphi_n & \varphi_{p_3}(-\varphi_n) & (-\varphi_{p_3})\varphi_n & (-\varphi_{p_3})(-\varphi_n) \end{bmatrix} =$$

$$\begin{bmatrix} 1 & 1 & 1 & 1 \\ \varphi_n & -\varphi_n & \varphi_n & -\varphi_n \\ \varphi_{p_1} & \varphi_{p_1} & \varphi_{p_1} & \varphi_{p_1} \\ \varphi_{p_1}\varphi_n & -\varphi_{p_1}\varphi_n & \varphi_{p_1}\varphi_n & -\varphi_{p_1}\varphi_n \\ \varphi_{p_2} & \varphi_{p_2} & -\varphi_{p_2} & -\varphi_{p_2} \\ \varphi_{p_2}\varphi_n & -\varphi_{p_2}\varphi_n & -\varphi_{p_2}\varphi_n & \varphi_{p_2}\varphi_n \\ \varphi_{p_3} & \varphi_{p_3} & -\varphi_{p_3} & -\varphi_{p_3} \\ \varphi_{p_3}\varphi_n & -\varphi_{p_3}\varphi_n & -\varphi_{p_3}\varphi_n & \varphi_{p_3}\varphi_n \end{bmatrix} ;$$

or, a matrix having a row and/or column transformation relationship with $W_{10}$; or, a product of $W_{10}$ and a constant coefficient, where for example, the constant coefficient may be $$\frac{1}{\sqrt{M \cdot P_{CSI\text{-}RS}}};$$

or a product of a constant coefficient and a matrix having a row and/or column transformation relationship with $W_{10}$, where for example, the constant coefficient may be $$\frac{1}{\sqrt{M \cdot P_{CSI\text{-}RS}}},$$

where an equation after the first equal sign is used for description. $\varphi_n = e^{j\pi n/2}$ is a polarization antenna phase factor, and may be a value in $\{+1, -1, +j, -j\}$, a value of n is in $\{0, 1, 2, 3\}$, $\varphi_{p_1}=e^{j\pi p_1/2}$ is an inter-antenna-port-group phase factor, $\varphi_{p_1}$ may be a value in $\{+1, -1, +j, -j\}$, a value of $p_1$ is in $\{0, 1, 2, 3\}$, $\varphi_{p_2}=e^{j\pi p_2/2}$ is an inter-antenna-port-group phase factor, $-\varphi_{p_2}$ is an inter-antenna-port-group phase factor, $\varphi_{p_2}$ may be a value in $\{+1, -1, +j, -j\}$, a value of $p_2$ is in $\{0, 1, 2, 3\}$, $\varphi_{p_3}=e^{j\pi p_3/2}$ is an inter-antenna-port-group phase factor, $-\varphi_{p_3}$ is an inter-antenna-port-group phase factor, $\varphi_{p_3}$ may be a value in $\{+1, -1, +j, -j\}$, and a value of $p_3$ is in $\{0, 1, 2, 3\}$.

Optionally, M=4, N=2, and when a codebook mode is a codebook mode 2, the precoding matrix in the codebook corresponding to the rank is or satisfies:

$$W_9 = \begin{bmatrix} 1 & 1 & 1 & 1 \\ \varphi_n & -\varphi_n & \varphi_n & -\varphi_n \\ a_{p_1}b_{n_1} & a_{p_1}b_{n_1} & -a_{p_1}b_{n_1} & -a_{p_1}b_{n_1} \\ a_{p_2}b_{n_2} & -a_{p_2}b_{n_2} & -a_{p_2}b_{n_2} & a_{p_2}b_{n_2} \end{bmatrix};$$

or a matrix having a row/column transformation relationship with $W_9$; or a product of $W_9$ and a constant coefficient, where for example, the constant coefficient may be $$\frac{1}{\sqrt{M \cdot P_{CSI-RS}}};$$

or a product of a constant coefficient and a matrix having a row/column transformation relationship with $W_9$, where for example, the constant coefficient may be $$\frac{1}{\sqrt{M \cdot P_{CSI-RS}}},$$

where $\varphi_n = e^{j\pi n/2}$ is a polarization antenna phase factor, and may be a value in $\{+1, -1, +j, -j\}$, a value of n is in $\{0, 1, 2, 3\}$, a value of $a_{p_1}$ is $e^{j\pi/4}e^{j\pi p_1/2}$, a value of $p_1$ is in $\{0, 1, 2, 3\}$, a value of $a_{p_2}$ is $e^{j\pi/4}e^{j\pi p_2/2}$, a value of $p_2$ is in $\{0, 1, 2, 3\}$, a value of $b_{n_1}$ is $e^{-j\pi/4}e^{j\pi n_1/2}$, a value of $n_1$ is in $\{0, 1\}$, a value of $b_{n_2}$ is $e^{-j\pi/4}e^{j\pi n_2/2}$, and a value of $n_2$ is in $\{0, 1\}$.

Optionally, M=3, N=2, and when a codebook mode is a codebook mode 2, the precoding matrix in the codebook corresponding to the rank includes three column vectors, where the three column vectors are a subset of column vectors in the following precoding matrix or a precoding matrix satisfying the following equation:

$$W_9 = \begin{bmatrix} 1 & 1 & 1 & 1 \\ \varphi_n & -\varphi_n & \varphi_n & -\varphi_n \\ a_{p_1}b_{n_1} & a_{p_1}b_{n_1} & -a_{p_1}b_{n_1} & -a_{p_1}b_{n_1} \\ a_{p_2}b_{n_2} & -a_{p_2}b_{n_2} & -a_{p_2}b_{n_2} & a_{p_2}b_{n_2} \end{bmatrix};$$

a matrix having a row/column transformation relationship with $W_9$; or a product of $W_9$ and a constant coefficient, where for example, the constant coefficient may be $$\frac{1}{\sqrt{M \cdot P_{CSI-RS}}};$$

or a product of a constant coefficient and a matrix having a row/column transformation relationship with $W_9$, where for example, the constant coefficient may be $$\frac{1}{\sqrt{M \cdot P_{CSI-RS}}},$$

where $\varphi_n = e^{j\pi n/2}$ is a polarization antenna phase factor, and may be a value in $\{+1, -1, +j, -j\}$, a value of n is in $\{0, 1, 2, 3\}$, a value of $a_{p_1}$ is $e^{j\pi/4}e^{j\pi p_1/2}$, a value of $p_1$ is in $\{0, 1, 2, 3\}$, a value of $a_{p_2}$ is $e^{j\pi/4}e^{j\pi p_2/2}$, a value of $p_2$ is in $\{0, 1, 2, 3\}$, a value of $b_{n_1}$ is $e^{-j\pi/4}e^{j\pi n_1/2}$, a value of $n_1$ is in $\{0, 1\}$, a value of $b_{n_2}$ is $e^{-j\pi/4}e^{j\pi n_2/2}$, and a value of $n_2$ is in $\{0, 1\}$.

Optionally, when the codebook mode is a codebook mode 2, a design of the codebook mode 2 also satisfies that a matrix corresponding to one antenna port group or each of at least two antenna port groups has two different inter-antenna-port-group phase factors, and any two column vectors in the precoding matrix are orthogonal to each other. Because transformation of the codebook mode 2 is relatively complex, a specific form of the inter-antenna-port-group phase factor is not provided in the foregoing descriptions, but this does not affect implementation of the solution.

Optionally, if necessary, the forms of the precoding matrices in the foregoing possible designs may be separately protected, and are not necessarily limited to the descriptions according to the first aspect or the second aspect.

Optionally, values of the foregoing parameters may be predefined in a protocol, or may be determined through configuration between the network device and the terminal device.

In the foregoing possible designs, a corresponding PMI feedback mechanism may also include the following several possible designs:

In a possible design, only the inter-antenna-port-group phase factor is quantized, or only the polarization antenna phase factor is quantized.

Correspondingly, the at least one PMI includes a first PMI and a second PMI or a third PMI, the first PMI is used to indicate the DFT vector, the second PMI is used to indicate the inter-antenna-port-group phase factor, and the third PMI is used to indicate the polarization antenna phase factor. Alternatively, the at least one PMI includes a first PMI and a tenth PMI. The first PMI is used to indicate the DFT vector, and the tenth PMI is used to indicate the inter-antenna-port-group phase factor, or is used to indicate the polarization antenna phase factor. Alternatively, the at least one PMI includes an eleventh PMI, and the eleventh PMI corresponds to a plurality of indicator fields (for example, including a plurality of indicator fields). One indicator field is used to indicate the DFT vector, and another indicator field is used to indicate the inter-antenna-port-group phase factor, or is used to indicate the polarization antenna phase factor. In this feedback mechanism, a parameter is fixed, so that signaling overheads can be reduced.

In another possible design, both an inter-antenna-port phase factor and the polarization antenna phase factor are quantized.

Correspondingly, the at least one PMI includes a first PMI, a second PMI, and a third PMI, the first PMI is used to indicate the DFT vector, the second PMI is used to indicate the inter-antenna-port-group phase factor, and the third PMI is used to indicate the polarization antenna phase factor.

Alternatively, the at least one PMI includes a first PMI and a fourth PMI, the first PMI is used to indicate the DFT vector, and the fourth PMI is used to indicate the inter-antenna-port-group phase factor and the polarization antenna phase factor. Alternatively, the at least one PMI includes a twelfth PMI and a third PMI. The twelfth PMI corresponds to a plurality of indicator fields (for example, including a plurality of indicator fields). One indicator field is used to indicate the DFT vector, and another indicator field is used to indicate the inter-antenna-port-group phase factor. The third PMI is used to indicate the polarization antenna phase factor. In this feedback mechanism, one PMI can carry a plurality of indicator fields to indicate a plurality of factors, thereby reducing signaling overheads.

Optionally, M is 8, N is 2, and the precoding matrix in the codebook corresponding to the rank is or satisfies:

$$W_3 = \begin{bmatrix} z_1 \cdot b_1 & z_1 \cdot b_1 & z_1 \cdot b_2 & z_1 \cdot b_2 & z_1 \cdot b_1 & z_1 \cdot b_1 & z_1 \cdot b_2 & z_1 \cdot b_2 \\ z_2 \cdot b_1 & -z_2 \cdot b_1 & z_2 \cdot b_2 & -z_2 \cdot b_2 & z_2 \cdot b_1 & -z_2 \cdot b_1 & z_2 \cdot b_2 & -z_2 \cdot b_2 \\ z_3 \cdot b_1 & z_3 \cdot b_1 & z_3 \cdot b_2 & z_3 \cdot b_2 & -z_3 \cdot b_1 & -z_3 \cdot b_1 & -z_3 \cdot b_2 & -z_3 \cdot b_2 \\ z_4 \cdot b_1 & -z_4 \cdot b_1 & z_4 \cdot b_2 & -z_4 \cdot b_2 & -z_4 \cdot b_1 & z_4 \cdot b_1 & -z_4 \cdot b_2 & z_4 \cdot b_2 \end{bmatrix};$$

or a matrix having a row and/or column transformation relationship with $W_3$; or a product of $W_3$ and a constant coefficient, where for example, the constant coefficient may be $$\frac{1}{\sqrt{M \cdot P_{CSI-RS}}};$$

or a product of a constant coefficient and a matrix having a row and/or column transformation relationship with $W_3$, where for example, the constant coefficient may be $$\frac{1}{\sqrt{M \cdot P_{CSI-RS}}},$$

where $b_1$ and $b_2$ are DFT vectors, $z_1=1$, $z_2$ is a polarization antenna phase factor, $z_3$ and $-z_3$ are inter-antenna-port-group phase factors, and $z_4$ is a product of the polarization antenna phase factor and the inter-antenna-port-group phase factor.

The precoding matrix provides yet another possible form for the codebook whose order is 8.

Optionally, M<8, N is 2, and the precoding matrix in the codebook corresponding to the rank includes M column vectors, where the M column vectors are a subset of column vectors in the following precoding matrix or a precoding matrix satisfying the following equation:

$$W_3 = \begin{bmatrix} z_1 \cdot b_1 & z_1 \cdot b_1 & z_1 \cdot b_2 & z_1 \cdot b_2 & z_1 \cdot b_1 & z_1 \cdot b_1 & z_1 \cdot b_2 & z_1 \cdot b_2 \\ z_2 \cdot b_1 & -z_2 \cdot b_1 & z_2 \cdot b_2 & -z_2 \cdot b_2 & z_2 \cdot b_1 & -z_2 \cdot b_1 & z_2 \cdot b_2 & -z_2 \cdot b_2 \\ z_3 \cdot b_1 & z_3 \cdot b_1 & z_3 \cdot b_2 & z_3 \cdot b_2 & -z_3 \cdot b_1 & -z_3 \cdot b_1 & -z_3 \cdot b_2 & -z_3 \cdot b_2 \\ z_4 \cdot b_1 & -z_4 \cdot b_1 & z_4 \cdot b_2 & -z_4 \cdot b_2 & -z_4 \cdot b_1 & z_4 \cdot b_1 & -z_4 \cdot b_2 & z_4 \cdot b_2 \end{bmatrix};$$

or a matrix having a row and/or column transformation relationship with $W_3$; or a product of $W_3$ and a constant coefficient, where for example, the constant coefficient may be $$\frac{1}{\sqrt{M \cdot P_{CSI-RS}}};$$

or a product of a constant coefficient and a matrix having a row and/or column transformation relationship with $W_3$, where for example, the constant coefficient may be $$\frac{1}{\sqrt{M \cdot P_{CSI-RS}}},$$

where $b_1$ and $b_2$ are DFT vectors, $z_1=1$, $z_2$ is a polarization antenna phase factor, $z_3$ and $-z_3$ are inter-antenna-port-group phase factors, and $z_4$ is a product of the polarization antenna phase factor and the inter-antenna-port-group phase factor.

The precoding matrix provides a possible form for the codebook whose order is 8.

A value of $z_k$ may be fixed, or may be quantized. A value of k is 2, 3, or 4.

In a possible design, a value of $z_k$ is in $\{+1, -1, +j, -j\}$, and a value of k is 2, 3, or 4.

Correspondingly, the at least one PMI includes a first PMI and a fifth PMI, the first PMI is used to indicate the DFT vector, and the fifth PMI is used to indicate at least one of $z_2$, $z_3$, and $z_4$.

In a possible design, $z_m = x_m^* y_m$, $x_m$ and $y_m$ are two components of $z_m$, and a value of m is one or more of 2, 3, and 4.

Optionally, $x_m$ is a wideband-related component, and $y_m$ is a subband-related component.

Correspondingly, the at least one PMI includes a first PMI, a sixth PMI, and a seventh PMI, the first PMI is used to indicate the DFT vector, the sixth PMI is used to indicate $x_m$, and the seventh PMI is used to indicate $y_m$.

If there are a plurality of values of m, in other words, a plurality of $z_m$ are quantized, the seventh PMI may include a plurality of pieces of information used to indicate $y_m$.

The at least one PMI includes an eighth PMI and a ninth PMI, the eighth PMI is used to indicate the DFT vector and $x_m$, and the ninth PMI is used to indicate $y_m$.

In this design, information used to indicate the DFT vector and $x_m$ that are fed back by using a wideband is carried in a same PMI, and information used to indicate $y_m$ fed back by using a subband is carried in one PMI, so that a quantity of PMIs can be decreased, and signaling overheads can be reduced. In this application, a precoding matrix used for a high-order codebook is provided, so that any two precoding column vectors in the precoding matrix are orthogonal to each other. Therefore, a data stream can be transmitted on a larger quantity of layers, thereby helping improve a rate of MIMO transmission, improving a data transmission capability of a communications system, and improving a throughput.

DESCRIPTION OF EMBODIMENTS

The following describes technical solutions of this application with reference to the accompanying drawings.

It should be understood that the technical solutions in this application may be applied to various communications systems, for example, a global system for mobile communications (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (LTE) system, a long term evolution advanced (LTE-A) system, a universal mobile telecommunications system (Universal Mobile Telecommunication System, UMTS), a next-generation communications system (for example, a fifth-generation (fifth-generation, 5G) system), a converged system of a plurality of access systems, or an evolved system. The 5G system may also be referred to as a new radio access technology (NR) system.

Figure 1:
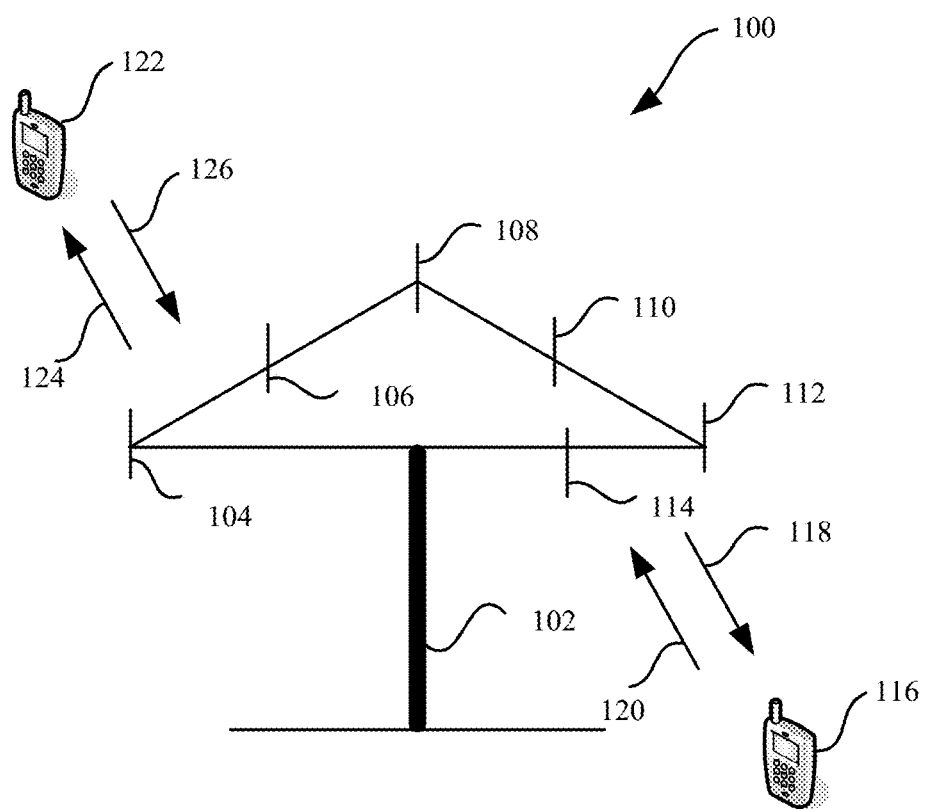
FIG. 1 is a schematic diagram of a communications system that is for a communication method and that is applicable to an embodiment of this application.

For ease of understanding of the embodiments of this application, a communications system 100 applicable to an embodiment of this application is first described in detail with reference to FIG. 1. FIG. 1 is a schematic diagram of a communications system 100 that is used for a data transmission method and apparatus and that is applicable to an embodiment of this application. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that, the transmitter chain and the receiver chain may each include a plurality of components (for example, a processor, a modulator, a multiplexer, a demodulator, a demultiplexer, or an antenna) related to signal sending and receiving.

It should be understood that the network device may be any device having wireless receiving and sending functions or a chip that may be disposed in the device. The device includes, but is not limited to, a base station (for example, a NodeB, an evolved NodeB eNodeB, a network device (such as a transmission point (transmission point, TP), a transmission reception point (transmission reception point, TRP), a base station, or a small cell device) in a fifth generation (the fifth generation, 5G) communications system, a network device in a future communications system, an access node in a Wi-Fi system, a wireless relay node, a wireless backhaul node, and the like.

The network device 102 may communicate with a plurality of terminal devices (for example, a terminal device 116 and a terminal device 122). The network device 102 may communicate with any quantity of terminal devices similar to the terminal device 116 or 122.

It should be understood that the terminal device may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet computer (Pad), a computer having wireless receiving and sending functions, a virtual reality (Virtual Reality, VR) terminal device, an augmented reality (Augmented Reality, AR) terminal device, a wireless terminal in industrial control (industrial control), a wireless terminal in self driving (self driving), a wireless terminal in remote surgery (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, the foregoing terminal device and the chip that may be disposed in the terminal device are collectively referred to as a terminal device.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

The embodiments of this application may be applied to downlink data transmission, may be applied to uplink data transmission, or may be applied to device-to-device (device to device, D2D) data transmission. For example, for downlink data transmission, a transmit-end device is a base station, and a corresponding receive-end device is UE. For uplink data transmission, a transmit-end device is UE, and a corresponding receive-end device is a base station. For D2D data transmission, a sending device is UE, and a corresponding receiving device is also UE. This is not limited in the embodiments of this application.

For example, in a frequency division duplex (frequency division duplex, FDD) system, for example, the forward link 118 and the reverse link 120 may use different frequency bands, and the forward link 124 and the reverse link 126 may use different frequency bands.

For another example, in a time division duplex (time division duplex, TDD) system and a full duplex (full duplex) system, the forward link 118 and the reverse link 120 may use a same frequency band, and the forward link 124 and the reverse link 126 may use a same frequency band.

Each antenna (or an antenna group including a plurality of antennas) and/or area designed for communication are/is referred to as a sector of the network device 102. For example, the antenna group may be designed to communicate with a terminal device in a sector within coverage of the network device 102. In a process in which the network device 102 communicates with the terminal devices 116 and 122 respectively by using the forward links 118 and 124, a transmit antenna of the network device 102 may improve signal-to-noise ratios of the forward links 118 and 124 through beamforming. In addition, compared with a manner in which a network device sends a signal to all terminal devices of the network device by using a single antenna, when the network device 102 sends, through beamforming, a signal to the terminal devices 116 and 122 that are randomly scattered within the related coverage, a mobile device in a neighboring cell is subject to less interference.

The network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of the data, and the transport block may be segmented to generate a plurality of code blocks.

In addition, the communications system 100 may be a public land mobile network (PLMN) network, a device-to-device (device to device, D2D) network, a machine-to-machine (machine to machine, M2M) network, or another network. FIG. 1 is merely a simplified schematic diagram used as an example for ease of understanding, and the network may further include another network device, which is not shown in FIG. 1.

Figure 2:
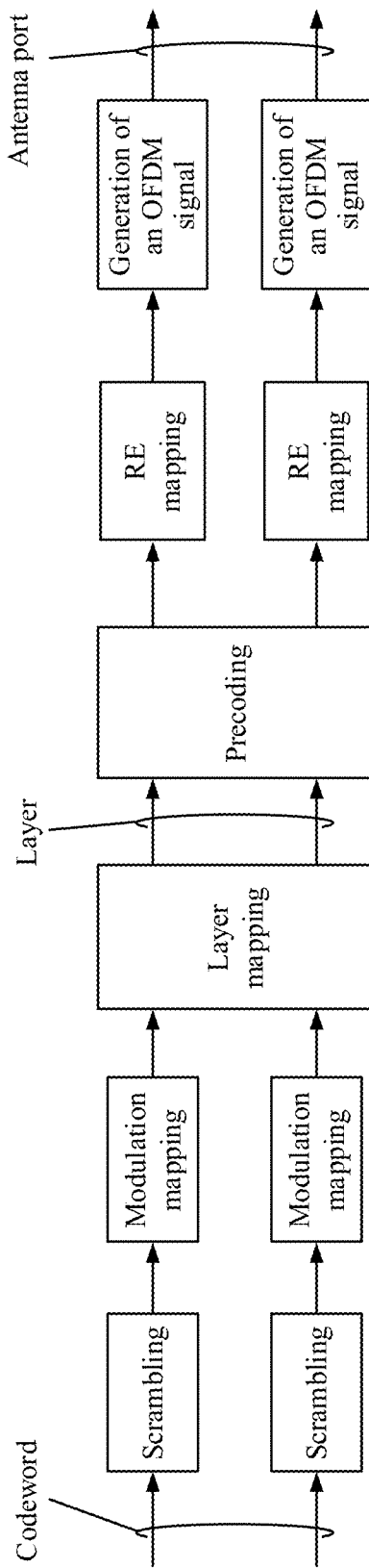
FIG. 2 is a schematic diagram of a downlink physical channel processing process used in an existing LTE system.

For ease of understanding of the embodiments of this application, the following briefly describes a downlink physical channel processing process in an LTE system with reference to FIG. 2. FIG. 2 is a schematic diagram of a downlink physical channel processing process used in an existing LTE system. A processing object of the downlink physical channel processing process is a code word, and the code word is usually a bit stream on which coding (at least including channel coding) is performed. The code word (code word) is scrambled (scrambling) to generate a scrambled bit stream. Modulation mapping (modulation mapping) is performed on the scrambled bit stream to obtain a modulated symbol stream. The modulated symbol stream is mapped to a plurality of layers (layer) through layer mapping (layer mapping). For ease of differentiation and description, in this embodiment of this application, the symbol stream on which layer mapping is performed may be referred to as a layer-mapping spatial layer (or referred to as a layer-mapping spatial stream or a layer-mapping symbol stream). The layer-mapping spatial layer is precoded (precoding) to obtain a plurality of precoded data streams (or referred to as precoded symbol streams). The precoded symbol streams are mapped to a plurality of resource elements (resource element, RE) through RE mapping. Orthogonal frequency division multiplexing (orthogonal frequency division multiplexing, OFDM) modulation is then performed on these REs, to generate an OFDM symbol stream. The OFDM symbol stream is then transmitted through an antenna port (antenna port).

A precoding technology may mean that a to-be-transmitted signal is preprocessed at a transmit end when a channel state is known, that is, the to-be-transmitted signal is processed by using a precoding matrix that matches a channel resource, so that the precoded to-be-transmitted signal adapts to a channel, and complexity of eliminating inter-channel impact at a receive end is reduced. Therefore, received signal quality (for example, a signal to interference plus noise ratio (signal to interference plus noise ratio, SINR)) is improved by precoding a transmitted signal. Therefore, transmission between a transmit-end device and a plurality of receive-end devices on a same time-frequency resource may be implemented by using the precoding technology, in other words, multi-user multiple-input multiple-output (multiple user multiple input multiple output, MU-MIMO) is implemented. It should be noted that related descriptions of the precoding technology are only used as an example, and are not used to limit the protection scope of the embodiments of this application. In a specific implementation process, precoding may alternatively be performed in another manner (where for example, when a channel matrix cannot be learned of, precoding is performed by using a preset precoding matrix or through weighting). Specific content is not described in detail in this specification.

To obtain a precoding matrix that can adapt to a channel, a transmit end usually performs channel estimation in advance by sending a reference signal, and obtains a feedback from a receive end, to determine a relatively accurate precoding matrix to precode to-be-sent data. Specifically, the transmit end may be a network device, the receive end may be a terminal device, and the reference signal may be a reference signal used for downlink channel measurement, for example, a channel state information-reference signal (channel state information reference signal, CSI-RS). The terminal device may perform CSI measurement based on the received CSI-RS, and feed back CSI of a downlink channel to the network device. Alternatively, the transmit end may be a terminal device, the receive end may be a network device, and the reference signal may be a reference signal used for uplink channel measurement, for example, a sounding reference signal (sounding reference signal, SRS). The network device may perform CSI measurement based on the received SRS, and indicate CSI of an uplink channel to the terminal device. The CSI may include, for example, a precoding matrix indicator (precoding matrix indicator, PMI), a rank indication (rank indication, RI), and a channel quality indicator (channel quality indicator, CQI).

With development of a multiple-antenna technology, a quantity of antenna ports increases. A plurality of antenna panels may be configured for a same network device owing to an increase in the quantity of antenna ports, to configure a plurality of antenna ports on the plurality of antenna panels. For example, at least one antenna port is configured on each antenna panel, and the at least one antenna port configured on each antenna panel may be referred to as an antenna port group.

Figure 3:
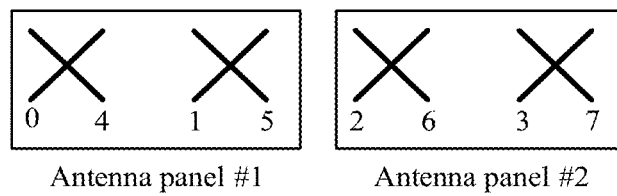
FIG. 3 is a schematic diagram showing that a plurality of antenna ports are configured on a plurality of antenna panels.

FIG. 3 is a schematic diagram showing that a plurality of antenna ports are configured on a plurality of antenna panels. Specifically, FIG. 3 is a schematic diagram showing that a plurality of antenna ports are configured on two antenna panels. Four antenna ports are configured on each antenna panel, and each × in the figure represents two antenna ports in different polarization directions. In the figure, four antenna ports are configured on each antenna panel. On an antenna panel #1, an antenna port 0 and an antenna port 1 are antenna ports in a same polarization direction, and correspond to a same beam vector (or referred to as a precoding vector), for example, denoted as $b_1$. An antenna port 4 and an antenna port 5 are antenna ports in a same polarization direction, and correspond to another same beam vector, for example, denoted as $b_2$. Similarly, on an antenna panel #2, an antenna port 2 and an antenna port 3 correspond to the beam vector $b_1$, and an antenna port 6 and an antenna port 7 correspond to the beam vector $b_2$. $b_1$ and $b_2$ may be two orthogonal discrete Fourier transform (discrete Fourier transform, DFT) vectors, or may be mathematical vectors representing a spatial electromagnetic wave feature. This is not particularly limited in this embodiment of this application.

It should be noted that, for ease of understanding, the case in which a plurality of antenna ports are configured on a plurality of antenna panels is described above with reference to FIG. 3. However, a correspondence between an antenna and an antenna port is not limited in the embodiments of this application, and one or more physical antennas may be configured as one antenna port. In other words, an antenna port may be understood as a transmit antenna identified by a receive-end device, or a transmit antenna that can be spatially distinguished. One antenna port is configured for each virtual antenna, each virtual antenna may be a weighted combination of a plurality of physical antennas, and each antenna port corresponds to one reference signal.

In the prior art, a precoding matrix in a multi-panel codebook may be obtained by concatenating precoding matrices in a plurality of single-panel codebooks (single-panel codebook), and different antenna panels are distinguished by using antenna panel phase factors. For example, one antenna panel corresponds to one antenna panel phase factor. Any two column vectors in a precoding matrix satisfy an orthogonal relationship. Therefore, a quantity of columns of the precoding matrix is limited by a quantity of antenna ports. For example, when four antenna ports are configured for each antenna panel, a maximum of four mutually orthogonal column vectors can be formed, that is, a rank is maximally 4.

Referring to FIG. 3 again, any antenna panel in FIG. 3 is used as an example. A structure of a precoding vector whose rank is 1 and that corresponds to an antenna port configured on one antenna panel may be $$\begin{bmatrix} b_1 \\ c \cdot b_1 \end{bmatrix},$$

where c is a polarization antenna phase factor, and may be any value in $\{+1, -1, +j, -j\}$. It should be understood that the precoding vector as an example herein is merely a possible schematic structure, and should not constitute any limitation on this embodiment of this application.

It should be noted that the polarization antenna phase factor may be understood as a phase factor used to distinguish antenna ports in different polarization directions.

Therefore, four orthogonal precoding column vectors that can be formed based on four antenna ports on one antenna panel may be obtained as $$\begin{bmatrix} b_1 & b_1 & b_2 & b_2 \\ c \cdot b_1 & -c \cdot b_1 & c \cdot b_2 & -c \cdot b_2 \end{bmatrix},$$

that is, the rank is 4.

If an antenna panel phase factor φ of two antenna panels is considered, four orthogonal precoding column vectors, namely, $$\begin{bmatrix} b_1 & b_1 & b_2 & b_2 \\ c \cdot b_1 & -c \cdot b_1 & c \cdot b_2 & -c \cdot b_2 \\ \varphi \cdot b_1 & \varphi \cdot b_1 & \varphi \cdot b_2 & \varphi \cdot b_2 \\ \varphi \cdot c \cdot b_1 & -\varphi \cdot c \cdot b_1 & \varphi \cdot c \cdot b_2 & -\varphi \cdot c \cdot b_2 \end{bmatrix},$$

may be formed. φ may be any value in $\{+1, -1, +j, -j\}$.

It should be noted that an inter-antenna-port-group phase factor, also referred to as an inter-antenna-panel phase factor, may be understood as a phase factor used to distinguish antenna ports in different antenna port groups (namely, antenna panels). A specific value of the inter-antenna-port-group phase factor may be determined based on a distance between the antenna panels or a calibration error.

It should further be noted that, that two precoding column vectors are orthogonal to each other means that: a product of a conjugate transpose of one precoding column vector and the other precoding column vector is zero.

However, in the prior art, there is still no method for providing a higher-order (for example, a rank is greater than 4) codebook to achieve orthogonality between column vectors in a precoding matrix, and therefore, no precoding matrix with a higher order can be provided to precode data. For example, four antenna ports are configured for each antenna panel shown in FIG. 3, only a precoding matrix whose rank is 1 to 4 can be provided, and a precoding matrix whose rank is 5 to 8 cannot be provided.

Usually, a quantity of layers of data is less than or equal to a maximum quantity of antenna ports that is supported by a communications system. A maximum quantity of antenna ports that is supported by a current communications system is 8. However, with development of 5G, the maximum quantity of antenna ports may tend to be larger, for example, may be 16, 32, or even 64. If no precoding matrix with a higher order can be provided to precode data, a quantity of parallel data streams in MIMO transmission is heavily limited. Consequently, a data transmission capability of the communications system is limited, and a throughput is affected.

Therefore, this application provides a communication method, to provide a higher-order codebook, thereby helping improve a data transmission capability of a communications system and improving a throughput.

It should be understood that the communication method provided in this application may be applicable to uplink transmission and downlink transmission. In downlink transmission, in the embodiments of this application, a first device may be a terminal device, a second device may be an access network device, and a reference signal may be a reference signal used for downlink channel measurement, for example, a CSI-RS. In downlink transmission, in the embodiments of this application, a first device may be an access network device, a second device may be a terminal device, and a reference signal may be a reference signal used for uplink channel measurement, for example, an SRS. The communication method in the embodiments of this application is described in detail below with reference to the accompanying drawings by separately using the uplink channel measurement and the downlink channel measurement as examples. However, it should be understood that the foregoing enumerated reference signals used for the uplink channel measurement and the downlink channel measurement are merely examples for description, and should not constitute any limitation on the embodiments of this application. In this application, another reference signal used for the uplink or downlink channel measurement may be defined in an existing protocol (for example, an LTE protocol) or a future protocol.

Figure 4:
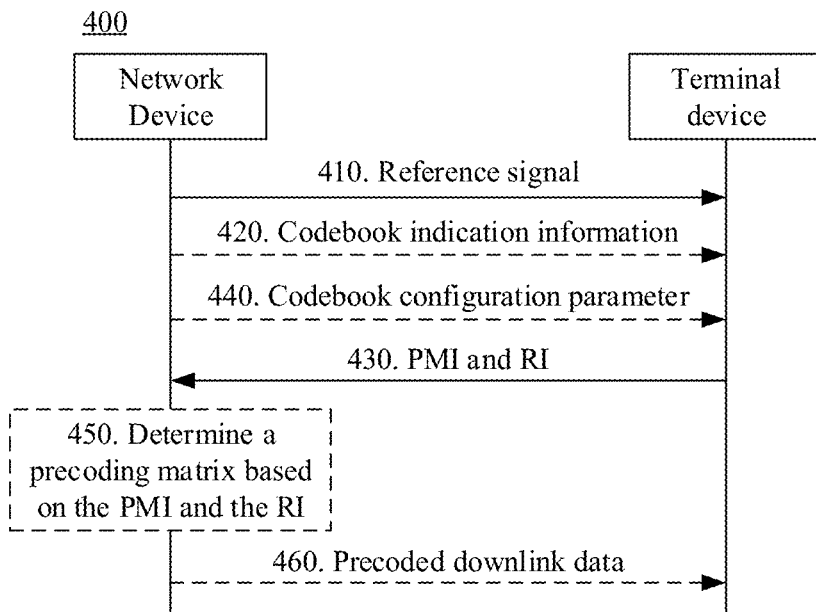
FIG. 4 is a schematic flowchart of a communication method according to an embodiment of this application.

FIG. 4 is a schematic flowchart, shown from a perspective of device interaction, of a communication method according to an embodiment of this application. Specifically, FIG. 4 shows a scenario of downlink channel measurement. As shown in the figure, the method shown in FIG. 4 may include step 410 to step 460.

Step 410. A network device sends a reference signal.

Correspondingly, in step 410, a terminal device receives the reference signal from the network device.

In this embodiment of this application, a plurality of antenna panels may be configured for the network device, one antenna port group is configured for each antenna panel, and each antenna port group includes at least one antenna port. For example, the antenna panel may be the antenna panel shown in FIG. 3. Certainly, more antenna ports may be configured for the antenna panel, or more antenna panels may be configured for the network device. This is not particularly limited in this embodiment of this application.

Alternatively, only one antenna panel may be configured for the network device, and at least one antenna port may be configured on the antenna panel.

It may be understood that a corresponding codebook when a plurality of antenna panels are configured for the network device may be different from that when only one antenna panel is configured for the network device. A difference between the multi-panel codebook and the single-panel codebook has been described above with reference to the example antenna panels in FIG. 3. To avoid repetition, details are not described herein again.

In addition, the network device may further notify the terminal device of information about a codebook type, a codebook configuration parameter, and the like, so that the network device and the terminal device use a same codebook, to determine a precoding matrix based on the same codebook.

Optionally, the method 400 further includes: Step 420. The network device sends codebook indication information to the terminal device, where the codebook indication information is used to indicate the codebook type.

In a possible design, the codebook indication information may be configured in higher layer signaling. For example, the codebook indication information is configured in a radio resource control (radio resource control, RRC) message. Specifically, the codebook indication information may be carried in an indicator field in the RRC message. For example, the indicator field may be one indicator bit, and "1" or "0" is used to indicate the multi-panel codebook or the single-panel codebook. When receiving the codebook indication information, the terminal device may determine that when the reference signal sent by the network device is received, at least one PMI that needs to be fed back for channel measurement is at least one PMI of the multi-panel codebook.

Step 430. The terminal device sends the PMI and an RI to the network device based on the reference signal.

First, the terminal device may estimate a channel matrix based on the received reference signal, and determine a rank of the channel matrix, namely, a quantity of columns of the precoding matrix, to determine a codebook corresponding to the rank.

In a possible implementation, after obtaining a channel matrix H through measurement based on the reference signal, the terminal device may perform singular value decomposition (singular value decomposition, SVD) on the channel matrix H, to determine, in the codebook, a precoding matrix most approximate to an ideal precoding matrix.

Specifically, after SVD is performed on the channel matrix, the following is obtained:

$$H = U \cdot S \cdot V^H$$

U and $V^H$ are unitary matrices, S is a diagonal matrix, non-zero elements (that is, diagonal elements) of S are singular values of the channel matrix H, and the singular values may be usually arranged in descending order. A conjugate transpose V of the right unitary matrix $V^H$ is the ideal precoding matrix. In other words, the ideal precoding matrix is a precoding matrix calculated based on the channel matrix H.

The terminal device may compare each candidate precoding matrix in the determined codebook with the ideal precoding matrix, and determine the precoding matrix most approximate to the ideal precoding matrix. The most approximate precoding matrix is a precoding matrix (which is denoted as a first precoding matrix for ease of differentiation and description, where it may be understood that the first precoding matrix is the precoding matrix most approximate to the ideal precoding matrix) fed back by the terminal device to the network device by using the PMI.

There may be a plurality of methods for determining, by the terminal device, the precoding matrix most approximate to the ideal precoding matrix. For example, the most approximate precoding matrix may be determined by determining a Euclidean distance between each candidate precoding matrix and the ideal precoding matrix.

It should be understood that the foregoing method, as an example, for determining the ideal precoding matrix through SVD is merely a possible implementation of determining the ideal precoding matrix, and should not constitute any limitation on this embodiment of this application. The terminal device may alternatively determine the rank and the precoding matrix by using a receiver algorithm such as a minimum mean square error (minimum mean square error, MMSE), zero-forcing (zero-forcing, ZF), or maximum ratio combining (maximal ratio combining, MRC), throughput maximization, SINR maximization, or another criterion, to determine the RI and the PMI to be fed back to the network device.

It should further be understood that a specific method for determining, by the terminal device, the channel matrix based on the reference signal, and determining the rank and the precoding matrix based on the channel matrix may be the same as that in the prior art. For brevity, detailed descriptions of a specific process of the method are omitted herein.

After determining the first precoding matrix based on the RI, the terminal device may send at least one PMI corresponding to the first precoding matrix to the network device, so that the network device determines a precoding matrix (which is denoted as a second precoding matrix for ease of differentiation and description) used to precode to-be-sent downlink data.

In this embodiment of this application, the first precoding matrix determined by the terminal device in the codebook may include a plurality of matrices in a one-to-one correspondence with a plurality of antenna port groups. A matrix corresponding to one antenna port group has two different inter-antenna-port-group phase factors, or a matrix corresponding to each of at least two antenna port groups has two different inter-antenna-port-group phase factors. In addition, any two column vectors in the precoding matrix are orthogonal to each other.

Optionally, a quantity of columns of the first precoding matrix corresponds to the rank, and a quantity of rows corresponds to a total quantity of antenna ports. In other words, a quantity of columns of the first precoding matrix represents a value of the rank, and a quantity of rows represents a total quantity of antenna ports. For ease of description, the rank is denoted as M (where M is greater than 1, and M is an integer), a quantity of antenna port groups is denoted as N (where N≥2, and N is an even number), and the first precoding matrix satisfies the following condition: matrices that correspond to N/2 antenna port groups and that are in the first precoding matrix include a first column vector set and a second column vector set, and an inter-antenna-port phase factor of the first column vector set and an inter-antenna-port phase factor of the second column vector set are opposite numbers.

Optionally, each antenna port group (where for example, each antenna panel corresponds to one antenna port group) includes $2N_1N_2$ CSI-RS antenna ports, $N_1$ represents a quantity of horizontal CSI-RS antenna ports, $N_2$ represents a quantity of vertical CSI-RS antenna ports, and the total quantity of antenna ports included in the N antenna port groups is $P_{CSI-RS}=2NN_1N_2$.

Column vectors in the first column vector set and the second column vector set have a same quantity of rows, namely, the total quantity of antenna ports. In addition, an arrangement order of the column vectors in the first column vector set and the column vectors in the second column vector set in the first precoding matrix is not limited in this embodiment of this application, and after row and/or column transformation is performed on the first precoding matrix, any two column vectors can still be orthogonal to each other.

The precoding matrix provided in this application is described in detail below with reference to a specific precoding matrix.

Optionally, the terminal device may further determine, based on the codebook configuration parameter received in step 430, the codebook corresponding to the rank.

Optionally, the method 400 further includes: Step 440. The network device sends the codebook configuration parameter to the terminal device.

In step 440, the network device may further notify the terminal device of the codebook configuration parameter, so that the terminal device determines a vector length of the precoding matrix, namely, the quantity of rows of the precoding matrix, based on the codebook configuration parameter.

It may be understood that numbers of the foregoing steps do not limit a chronological order of the steps, and the chronological order of the steps may be determined based on implementation of the solution. For example, step 420 may be performed before step 430, or may be performed after step 430.

In this embodiment of this application, the antenna ports configured on the antenna panels may be equally allocated, in other words, quantities of antenna ports allocated to the antenna panels may be the same. Therefore, when learning of any one of the following enumerated codebook configuration parameters, the terminal device may determine the total quantity of antenna ports, a quantity of antenna panels, and a quantity of antenna ports included on each antenna panel.

Optionally, the codebook configuration parameter may include any one of the following:

the quantity of antenna port groups and a quantity of antenna ports included in each antenna port group;

the quantity of antenna port groups and the total quantity of antenna ports;

the total quantity of antenna ports and a quantity of antenna ports included in each antenna port group; or a quantity of horizontal antenna ports included in each antenna port group and a quantity of vertical antenna ports included in each antenna port group and the quantity of antenna port groups.

Optionally, the codebook configuration parameter may be configured in higher layer signaling.

For example, the codebook configuration parameter is configured in an RRC message.

Optionally, the method further includes: Step 450: The network device may determine the precoding matrix based on the received PMI and RI, and precode the to-be-sent downlink data.

Specifically, the network device may determine, based on the received PMI and RI, a precoding matrix W corresponding to the PMI, or may perform mathematical transformation based on the precoding matrix corresponding to the PMI, where for example, a precoding matrix obtained after the mathematical transformation may be a precoding matrix in orthogonal subspace of W; and precode the to-be-sent downlink data.

It should be understood that a specific method for determining, by the network device, the precoding matrix based on the received PMI and RI may be the same as that in the prior art. For brevity, detailed descriptions of a specific process of the method are omitted herein.

Optionally, the method 400 further includes: Step 460. The network device sends the precoded downlink data.

Correspondingly, in step 460, the terminal device receives the precoded downlink data.

In step 460, when sending the precoded downlink data to the terminal device, the network device may further send a precoded demodulation reference signal (demodulation reference signal, DMRS), so that the terminal device determines an equivalent channel matrix based on the DMRS, and further performs demodulation to obtain the downlink data sent by the network device.

It should be understood that a processing process after the terminal device receives the downlink data may be the same as that in the prior art. For brevity, detailed descriptions of a specific process of the processing process are omitted herein.

The foregoing describes in detail the specific procedure of the communication method in this embodiment of this application with reference to FIG. 4. The following describes in detail, with reference to specific examples, the precoding matrix provided in this application and a corresponding PMI feedback mechanism.

In this embodiment of this application, a plurality of different precoding matrices are provided with reference to different values of the rank and different quantities of antenna panels. For ease of description, it is assumed below that there are four antenna ports on each antenna panel, and there are antenna ports in two polarization directions on each antenna panel. Therefore, there are two antenna ports in each polarization direction, and beam vectors in a maximum of two polarization directions may be formed for each antenna panel. The beam vectors in the two polarization directions are denoted as $b_1$ and $b_2$, and are orthogonal to each other. More specifically, $b_1$ and $b_2$ are one-dimensional or two-dimensional DFT vectors on which oversampling is performed and that are orthogonal to each other. For example, $b_1$ and $b_2$ may be respectively:

$$b_1(i_{1,1}, i_{1,2}) = \left[ u_{i_{1,1}} \quad e^{j\frac{2\pi i_{1,2}}{O_1 N_1}} u_{i_{1,1}} \quad \ldots \quad e^{j\frac{2\pi i_{1,2}(N_1-1)}{O_1 N_1}} u_{i_{1,1}} \right]^T$$

$$b_2(i_{1,1}, i_{1,2}) = \left[ u_{i_{1,1}+O_1} \quad e^{j\frac{2\pi i_{1,2}}{O_1 N_1}} u_{i_{1,1}+O_1} \quad \ldots \quad e^{j\frac{2\pi i_{1,2}(N_1-1)}{O_1 N_1}} u_{i_{1,1}+O_1} \right]^T$$

$$u_{i_{1,1}} = \left[ 1 \quad e^{j\frac{2\pi i_{1,1}}{O_2 N_2}} \quad \ldots \quad e^{j\frac{2\pi i_{1,1}(N_2-1)}{O_2 N_2}} \right]$$

$$u_{i_{1,1}+O_1} = \left[ 1 \quad e^{j\frac{2\pi (i_{1,1}+O_1)}{O_2 N_2}} \quad \ldots \quad e^{j\frac{2\pi (i_{1,1}+O_1)(N_2-1)}{O_2 N_2}} \right]$$

$i_{1,1}$ and $i_{1,2}$ are indexes of the beam vector, and may be indicated by using one PMI. $N_1$ and $N_2$ are quantities of antenna ports in different polarization directions, $O_1$ and $O_2$ are oversampling factors corresponding to the antenna ports in the different polarization directions, e represents a natural constant, and j represents a unit imaginary number.

Case 1: The rank M=8, and the quantity N of antenna port groups (that is, the quantity of antenna panels)=2.

Assuming that a polarization antenna phase factor is c, and an inter-antenna-port-group phase factor is $\varphi$, a basic form of the precoding matrix that is in the codebook corresponding to the rank and that is provided in this embodiment of this application may be expressed as:

this embodiment of this application, and the precoding matrix may be understood as satisfying an equation relationship of $W_0$. In specific descriptions, the "basic form" may be omitted. However, because performing collation and transformation, such as normalization, and/or row/column relationship transformation on the precoding matrix has no substantial impact on application of the precoding matrix, it should be understood that a precoding matrix obtained by performing collation and transformation, such as normalization, and/or row/column relationship transformation on the precoding matrix provided in this embodiment should also fall within the disclosure scope of the precoding matrix that is in the codebook corresponding to the rank and that is provided in this embodiment of this application.

For example:

The precoding matrix in the codebook corresponding to the rank may be $W_0$, or, a matrix having a row/column transformation relationship with $W_0$, or, a product of $W_0$ and a constant coefficient, where for example, the constant coefficient may be $$\frac{1}{\sqrt{M \cdot P_{CSI-RS}}},$$

or, a product of a constant coefficient and a matrix having a row/column transformation relationship with $W_0$, where for example, the constant coefficient may be $$\frac{1}{\sqrt{M \cdot P_{CSI-RS}}}.$$

To distinguish different values of a same inter-antenna-port-group phase factor, the same inter-antenna-port-group phase factor $\varphi$ is separately defined as $\varphi_{n1}$ and $\varphi_{n2}$ (n≥1, and n is an integer), and n is used to distinguish different antenna port groups. Inter-antenna-port phase factors corresponding to a same antenna port group are mutually opposite numbers. Therefore, for the inter-antenna-port-group phase factors corresponding to the antenna port group in $W_0$, $\varphi_{11}=-\varphi_{12}$.

Different embodiments are given below with reference to different quantization cases. It should be noted that "fixing" described below may be understood as that the parameter is fixed, and a value of the parameter may be defined in a protocol. "Quantization" may be understood as that the $$W_0 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & -\varphi_{12}\begin{pmatrix} b_1 \\ c \cdot b_1 \end{pmatrix} & -\varphi_{12}\begin{pmatrix} b_1 \\ -c \cdot b_1 \end{pmatrix} & -\varphi_{12}\begin{pmatrix} b_2 \\ c \cdot b_2 \end{pmatrix} & -\varphi_{12}\begin{pmatrix} b_2 \\ -c \cdot b_2 \end{pmatrix} \end{bmatrix};$$

or a matrix having a row/column transformation relationship with $W_0$.

In this embodiment of this application, the basic form means that a precoding matrix obtained after collation and transformation, such as normalization, are performed based on the basic form of the precoding matrix also falls within a disclosure scope of the precoding matrix that is in the codebook corresponding to the rank and that is provided in parameter is determined based on different channel states. As a channel state changes, the parameter may change, and needs to be indicated through a PMI feedback of the terminal device. In this embodiment of the present application, parameters that can be fixed include the polarization antenna phase factor and the inter-antenna-port-group phase factor. Regardless of whether the parameters are fixed, values of the polarization antenna phase factor and the inter-antenna-port-group phase factor may be both in {+1, −1, +j, −j}.

Specific cases are described in detail below.

(1) The inter-antenna-port-group phase factor is fixed, and the polarization antenna phase factor is quantized.

For two antenna port groups, an inter-antenna-port-group phase factor of one antenna port group may have a value of 1, and an inter-antenna-port-group phase factor of the other antenna port group may have two values that are mutually opposite numbers, for example, {+1, −1}, or {+j, −j}.

In this case, the precoding matrix in the codebook corresponding to the rank may be any one of the following precoding matrices or a matrix having a row/column transformation relationship with any one of the following precoding matrices. Alternatively, the precoding matrix in the codebook corresponding to the rank may satisfy any one of the following precoding matrices or a matrix having a row/column transformation relationship with any one of the following precoding matrices:

$$W_4 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_2 & -c \cdot b_1 & c \cdot b_2 & -c \cdot b_2 \\ b_1 & b_2 & b_2 & b_2 & -\begin{pmatrix} b_1 \\ c \cdot b_1 \end{pmatrix} & -\begin{pmatrix} b_1 \\ -c \cdot b_1 \end{pmatrix} & -\begin{pmatrix} b_2 \\ c \cdot b_2 \end{pmatrix} & -\begin{pmatrix} b_2 \\ -c \cdot b_2 \end{pmatrix} \\ c \cdot b_1 & -c \cdot b_1 & c \cdot b_2 & -c \cdot b_2 & & & & \end{bmatrix}; \text{ or}$$

$$W_5 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ b_2 & b_2 & b_1 & b_1 & -b_2 & -b_2 & -b_1 & -b_1 \\ c \cdot b_2 & -c \cdot b_2 & c \cdot b_1 & -c \cdot b_1 & -c \cdot b_2 & c \cdot b_2 & -c \cdot b_1 & c \cdot b_1 \end{bmatrix};$$

or a product of $W_4/W_5$ and a constant coefficient, where for example, the constant coefficient may be $$\frac{1}{\sqrt{M \cdot P_{CSI-RS}}};$$

or a product of a constant coefficient and a matrix having a row/column transformation relationship with $W_4/W_5$, where for example, the constant coefficient may be $$\frac{1}{\sqrt{M \cdot P_{CSI-RS}}}.$$

c is the polarization antenna phase factor, and may be a value in {+1, −1, +j, −j}. In addition, $c(d)=e^{j\pi d/2}$, and d is an index of the polarization antenna phase factor, and may be indicated by using another PMI.

Specifically, for a correspondence between a value of d and c(d), refer to the following table:

| d | c(d) |
|---|------|
| 0 | 1 |
| 1 | j |
| 2 | −1 |
| 3 | −j |

It may be learned that, in $W_4$ and $W_5$, two upper rows correspond to the first antenna port group, two lower rows correspond to the second antenna port group, and values of the inter-antenna-port-group phase factors are both {+1, −1}. In $W_4$, beam vectors of a same layer that correspond to antenna ports in different antenna port groups are the same. For example, beam vectors of the first column vector shown in $W_4$ are all $b_1$. In $W_5$, beam vectors of a same layer that correspond to antenna ports in different antenna port groups are different. For example, a beam vector that is of the first column vector shown in $W_5$ and that corresponds to the first antenna port group is $b_1$, and a beam vector corresponding to the second antenna port group is $b_2$.

In this case, the at least one PMI may include a first PMI and a second PMI, the first PMI is used to indicate the DFT vector, and the second PMI is used to indicate the polarization antenna phase factor.

Alternatively, the at least one PMI includes a first PMI and a tenth PMI. The first PMI is used to indicate the DFT vector, and the tenth PMI is used to indicate the polarization antenna phase factor.

Alternatively, the at least one PMI includes an eleventh PMI, and the eleventh PMI corresponds to a plurality of indicator fields (for example, including a plurality of indicator fields). One indicator field is used to indicate the DFT vector, and another indicator field is used to indicate the polarization antenna phase factor.

In this embodiment of this application, the first PMI may include the indexes $i_{1,1}$ and $i_{1,2}$ of the beam vector, and the second PMI may include the index d of the polarization antenna phase factor.

Optionally, step 430 specifically includes:

sending, by the terminal device, the first PMI, the second PMI, and the RI to the network device based on the reference signal;

sending, by the terminal device, the first PMI, the tenth PMI, and the RI to the network device based on the reference signal; or sending, by the terminal device, the eleventh PMI and the RI to the network device based on the reference signal.

(2) The polarization antenna phase factor is fixed, and the inter-antenna-port-group phase factor is quantized.

The polarization antenna phase factor c may be a value in {+1, −1, +j, −j}, and it is assumed that c=1 herein.

For two antenna port groups, an inter-antenna-port-group phase factor of one antenna port group may have a value of 1, and an inter-antenna-port-group phase factor of the other antenna port group may have two values that are mutually opposite numbers. For ease of differentiation, the two values are denoted as $\varphi_{11}$ and $\varphi_{12}$, $\varphi_{11}=-\varphi_{12}$, and $\varphi_{11}$ may be a value in {+1, −1, +j, −j}.

In this case, the precoding matrix in the codebook corresponding to the rank may be or satisfy:

$$W_6 = \begin{bmatrix} b_1 & b_1 & b_2 & b_2 & b_1 & b_1 & b_2 & b_2 \\ b_1 & -b_1 & b_2 & -b_2 & b_1 & -b_1 & b_2 & -b_2 \\ \varphi_{11}\begin{pmatrix} b_1 \\ b_1 \end{pmatrix} & \varphi_{11}\begin{pmatrix} b_1 \\ -b_1 \end{pmatrix} & \varphi_{11}\begin{pmatrix} b_2 \\ b_2 \end{pmatrix} & \varphi_{11}\begin{pmatrix} b_2 \\ -b_2 \end{pmatrix} & -\varphi_{12}\begin{pmatrix} b_1 \\ b_1 \end{pmatrix} & -\varphi_{12}\begin{pmatrix} b_1 \\ -b_1 \end{pmatrix} & -\varphi_{12}\begin{pmatrix} b_2 \\ b_2 \end{pmatrix} & -\varphi_{12}\begin{pmatrix} b_2 \\ -b_2 \end{pmatrix} \end{bmatrix};$$

or a matrix having a row/column transformation relationship with $W_6$; or a product of $W_6$ and a constant coefficient, where for example, the constant coefficient may be $$\frac{1}{\sqrt{M \cdot P_{CSI-RS}}};$$

or a product of a constant coefficient and a matrix having a row/column transformation relationship with $W_6$, where for example, the constant coefficient may be $$\frac{1}{\sqrt{M \cdot P_{CSI-RS}}}.$$

For two antenna port groups, a value of an inter-antenna-port-group phase factor of one antenna port group may have a value of 1, and an inter-antenna-port-group phase factor of the other antenna port group may have two values that are mutually opposite numbers. In the foregoing equation, $\varphi_{11}$ and $\varphi_{12}$ are inter-antenna-port-group phase factors corresponding to a same antenna port group, $\varphi_{11}=-\varphi_{12}$, and a value of $\varphi_{11}$ may be in $\{+1, -1, +j, -j\}$. In addition, $\varphi(p)=e^{j\pi p/2}$, and p is an index of the inter-antenna-port-group phase factor, and may be indicated by using a PMI.

Specifically, for a correspondence between a value of p and $\varphi(p)$, refer to the following table:

| p | $\varphi(p)$ |
|---|---|
| 0 | 1 |
| 1 | j |
| 2 | −1 |
| 3 | −j |

In addition, in $W_6$, beam vectors of a same layer that correspond to antenna ports of in different antenna port groups may be the same or may be different.

In this case, the at least one PMI may include a first PMI and a third PMI, the first PMI is used to indicate the DFT vector, and the third PMI is used to indicate the inter-antenna-port-group phase factor. In this embodiment of this application, the first PMI may include the indexes $i_{1,1}$ and $i_{1,2}$ of the beam vector, and the third PMI may include the index p of the inter-antenna-port-group phase factor.

Alternatively, the at least one PMI includes a first PMI and a tenth PMI. The first PMI is used to indicate the DFT vector, and the tenth PMI is used to indicate the inter-antenna-port-group phase factor.

Alternatively, the at least one PMI includes an eleventh PMI, and the eleventh PMI corresponds to a plurality of indicator fields (for example, including a plurality of indicator fields). One indicator field is used to indicate the DFT vector, and another indicator field is used to indicate the inter-antenna-port-group phase factor.

Optionally, step 420 specifically includes:

sending, by the terminal device, the first PMI, the third PMI, and the RI to the network device based on the reference signal;

sending, by the terminal device, the first PMI, the tenth PMI, and the RI to the network device based on the reference signal; or sending, by the terminal device, the eleventh PMI and the RI to the network device based on the reference signal.

(3) Both the polarization antenna phase factor and the inter-antenna-port-group phase factor are quantized.

The precoding matrix in the codebook corresponding to the rank may be or satisfy:

$$W_1 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \end{bmatrix};$$

a matrix having a row/column transformation relationship with $W_1$;

a product of $W_1$ and a constant coefficient, where for example, the constant coefficient may be $$\frac{1}{\sqrt{M \cdot P_{CSI-RS}}};$$

or a product of a constant coefficient and a matrix having a row/column transformation relationship with $W_1$, where for example, the constant coefficient may be $$\frac{1}{\sqrt{M \cdot P_{CSI-RS}}}.$$

c is the polarization antenna phase factor, and may be a value in $\{+1, -1, +j, -j\}$. In addition, $c(d)=e^{j\pi d/2}$, and d is an index of the polarization antenna phase factor, and may be indicated by using a PMI. $\varphi_{11}$ and $\varphi_{12}$ are inter-antenna-port-group phase factors, $\varphi_{11}=-\varphi_{12}$, and a value of $\varphi_{11}$ may be in $\{+1, -1, +j, -j\}$. In addition, $\varphi(p)=e^{j\pi p/2}$, and p is an index of the inter-antenna-port-group phase factor, and may be indicated by using another PMI.

In addition, in $W_1$, beams of a same layer that correspond to antenna ports of in different antenna port groups may be the same or may be different.

In this case, the at least one PMI may include a first PMI, a second PMI, and a third PMI. The first PMI is used to indicate the DFT vector, the second PMI is used to indicate the polarization antenna phase factor, and the third PMI is used to indicate the inter-antenna-port-group phase factor.

Alternatively, the at least one PMI may include a twelfth PMI and a third PMI. The twelfth PMI corresponds to a plurality of indicator fields (for example, including a plurality of indicator fields). One indicator field is used to indicate the DFT vector, and another indicator field is used to indicate the inter-antenna-port-group phase factor. The third PMI is used to indicate the polarization antenna phase factor.

Optionally, step 420 specifically includes:

sending, by the terminal device, the first PMI, the second PMI, the third PMI, and the RI based on the reference signal; or sending, by the terminal device, the twelfth PMI, the third PMI, and the RI to the network device based on the reference signal.

Alternatively, the at least one PMI may include a first PMI and a fourth PMI. The first PMI is used to indicate the DFT vector, and the fourth PMI is used to indicate the polarization antenna phase factor and the inter-antenna-port-group phase factor.

In a possible design, two indexes, namely, the polarization antenna phase factor and the inter-antenna-port-group phase factor, are indicated in a same PMI. That is, the first PMI may include the indexes $i_{1,1}$ and $i_{1,2}$ of the beam vector, and the fourth PMI includes the index d of the polarization antenna phase factor and the index p of the inter-antenna-port-group phase factor. In another possible design, there may be a binding relationship between the polarization antenna phase factor and the inter-antenna-port-group phase factor. When one value in the polarization antenna phase factor and the inter-antenna-port-group phase factor is used, the other value may be determined based on the binding relationship. In this case, the polarization antenna phase factor or the inter-antenna-port-group phase factor may be indicated in the PMI. That is, the first PMI may include the indexes $i_{1,1}$ and $i_{1,2}$ of the beam vector, and the fourth PMI includes the index d of the polarization antenna phase factor or the index p of the inter-antenna-port-group phase factor.

Optionally, step 420 specifically includes:

sending, by the terminal device, the first PMI, the fourth PMI, and the RI based on the reference signal.

(4) The polarization antenna phase factor or the inter-antenna-port-group phase factor is quantized.

The foregoing precoding matrix $W_0$ may be transformed to obtain:

$$W_3 = \begin{bmatrix} z_1 \cdot b_1 & z_1 \cdot b_1 & z_1 \cdot b_2 & z_1 \cdot b_2 & z_1 \cdot b_1 & z_1 \cdot b_1 & z_1 \cdot b_2 & z_1 \cdot b_2 \\ z_2 \cdot b_1 & -z_2 \cdot b_1 & z_2 \cdot b_2 & -z_2 \cdot b_2 & z_2 \cdot b_1 & -z_2 \cdot b_1 & z_2 \cdot b_2 & -z_2 \cdot b_2 \\ z_3 \cdot b_1 & z_3 \cdot b_1 & z_3 \cdot b_2 & z_3 \cdot b_2 & -z_3 \cdot b_1 & -z_3 \cdot b_1 & -z_3 \cdot b_2 & -z_3 \cdot b_2 \\ z_4 \cdot b_1 & -z_4 \cdot b_1 & z_4 \cdot b_2 & -z_4 \cdot b_2 & -z_4 \cdot b_1 & z_4 \cdot b_1 & -z_4 \cdot b_2 & z_4 \cdot b_2 \end{bmatrix}$$

In this case, the precoding matrix in the codebook corresponding to the rank may be or satisfy $W_3$, or, a matrix having a row/column transformation relationship with $W_3$, or, a product of $W_3$ and a constant coefficient, where for example, the constant coefficient may be $$\frac{1}{\sqrt{M \cdot P_{CSI-RS}}},$$

or, a product of a constant coefficient and a matrix having a row/column transformation relationship with $W_3$, where for example, the constant coefficient may be $$\frac{1}{\sqrt{M \cdot P_{CSI-RS}}}.$$

$z_1 = 1$, $z_2$ is the polarization antenna phase factor, $z_3$ and $-z_3$ are inter-antenna-port-group phase factors, and $z_4$ is a product of the polarization antenna phase factor and the inter-antenna-port-group phase factor.

Some or all of $z_2$, $z_3$, and $z_4$ may be fixed or quantized.

If all of $z_2$, $z_3$, and $z_4$ are fixed, values of $z_2$, $z_3$, and $z_4$ are all in $\{+1, -1, +j, -j\}$. A specific value may be pre-fixed in a protocol, and does not need to be quantized by using a PMI.

If some of $z_2$, $z_3$, and $z_4$ are quantized, at least two cases may be included:

Case A: A value of $z_k$ is in $\{+1, -1, +j, -j\}$, and a value of k is one or more of 2, 3, and 4.

In other words, value ranges of $z_2$, $z_3$, and $z_4$ are $\{+1, -1, +j, -j\}$. However, a specific value may be indicated by using a PMI.

In this case, the at least one PMI may include a first PMI and a fifth PMI, the first PMI is used to indicate the beam vector, and the fifth PMI is used to indicate at least one of $z_2$, $z_3$, and $z_4$.

The first PMI may include the indexes $i_{1,1}$ and $i_{1,2}$ of the beam vector, and the fifth PMI may include an index d of the polarization antenna phase factor or an index p of the inter-antenna-port-group phase factor.

Optionally, step 420 specifically includes:

sending, by the terminal device, the first PMI, the fifth PMI, and the RI based on the reference signal.

Alternatively, the plurality values of $z_k$ may be indicated by using a plurality of PMIs. In other words, a plurality of indexes are carried in a plurality of PMIs.

Case B: $z_m = x_m * y_m$, and $x_m$ and $y_m$ are two components of $z_m$. Specifically, $x_m$ represents a wideband-related component corresponding to $z_m$, $y_m$ represents a subband-related component corresponding to $z_m$, and a value of m is one or more of 2, 3, and 4.

$$x_m \in \left\{e^{\frac{j\pi}{4}}, e^{\frac{j3\pi}{4}}, e^{\frac{j5\pi}{4}}, e^{\frac{j7\pi}{4}}\right\}, \text{ and } y_m \in \left\{e^{-\frac{j\pi}{4}}, e^{\frac{j\pi}{4}}\right\}.$$

That is, values of $z_2$, $z_3$, and $z_4$ may be separately indicated by using a wideband PMI and a subband PMI. In this feedback mechanism, CSI can be fed back more accurately, and a more accurate precoding matrix can be determined, to adapt to a channel state.

In this case, the at least one PMI may include a first PMI, a sixth PMI, and a seventh PMI, the first PMI is used to indicate the beam vector, each sixth PMI is used to indicate one value of $x_m$, and each seventh PMI is used to indicate one value of $y_m$.

The first PMI may include the indexes $i_{1,1}$ and $i_{1,2}$ of the beam vector, the sixth PMI may include an index used to indicate $x_m$, and the seventh PMI may include an index used to indicate $y_m$. Optionally, step 420 specifically includes:

sending, by the terminal device, the first PMI, the sixth PMI, the seventh PMI, and the RI based on the reference signal.

Alternatively, the at least one PMI may include a seventh PMI and an eighth PMI.

The seventh PMI may include an index used to indicate $y_m$, and the eighth PMI may include the indexes $i_{1,1}$ and $i_{1,2}$ of the beam vector and an index used to indicate $x_m$.

It should be understood that the foregoing enumerated quantization solutions and feedback mechanisms are merely examples for description, and should not constitute any limitation on this application. In this application, another PMI may be fed back on the basis of using the precoding matrix provided in this application and mathematical transformation of the precoding matrix, to implement a same or similar function. For example, the at least one PMI may alternatively include only two PMIs that are respectively used to indicate any two of the three factors: the beam vector, the polarization antenna phase factor, and the inter-antenna-port-group phase factor.

Case 2: The rank <8, and the quantity N of antenna port groups (that is, the quantity of antenna panels)=2.

Various possible precoding matrices when the rank M=8 and the corresponding PMI feedback mechanisms are shown above. When the rank M<8, the precoding matrix in the codebook corresponding to the rank may include M column vectors. The M column vectors are a subset of column vectors in any one of the foregoing precoding matrices $W_0$, $W_1$, $W_3$, $W_4$, $W_5$, or $W_6$, or, the M column vectors are a subset of column vectors in a matrix having a row/column transformation relationship with any one of the foregoing matrices. Alternatively, the M column vectors are a subset of column vectors in a product matrix of a constant coefficient $$\frac{1}{\sqrt{M \cdot P_{CSI-RS}}}$$

and any one of the foregoing precoding matrices $W_0$, $W_1$, $W_3$, $W_4$, $W_5$, and $W_6$. Alternatively, the M column vectors are a subset of column vectors in a product matrix of a constant coefficient $$\frac{1}{\sqrt{M \cdot P_{CSI-RS}}}$$

and a matrix having a row/column transformation relationship with any one of the foregoing precoding matrices $W_0$, $W_1$, $W_3$, $W_4$, $W_5$, and $W_6$. Alternatively, the M column vectors are a subset of column vectors satisfying any one of the foregoing precoding matrices $W_0$, $W_1$, $W_3$, $W_4$, $W_5$, and $W_6$, or, the M column vectors are a subset of column vectors satisfying a matrix having a row/column transformation relationship with any one of the foregoing matrices. Alternatively, the M column vectors are a subset of column vectors satisfying a product matrix of a constant coefficient $$\frac{1}{\sqrt{M \cdot P_{CSI-RS}}}$$

and any one of the foregoing precoding matrices $W_0$, $W_1$, $W_3$, $W_4$, $W_5$, and $W_6$. Alternatively, the M column vectors are a subset of column vectors satisfying a product matrix of a constant coefficient $$\frac{1}{\sqrt{M \cdot P_{CSI-RS}}}$$

and a matrix having a row/column transformation relationship with any one of the foregoing precoding matrices $W_0$, $W_1$, $W_3$, $W_4$, $W_5$, and $W_6$.

Using M=5 as an example, the precoding matrix in the codebook corresponding to the rank includes five column vectors, the five column vectors may be any five column vectors in any of the foregoing precoding matrices $W_0$, $W_1$, $W_3$, $W_4$, $W_5$, and $W_6$, and row/column transformation may further be performed on the five column vectors. Alternatively, the five column vectors may be five column vectors in a precoding matrix formed by multiplying any one of the foregoing precoding matrices $W_0$, $W_1$, $W_3$, $W_4$, $W_5$, and $W_6$ by a constant coefficient $$\frac{1}{\sqrt{5 \cdot P_{CSI-RS}}}$$

(or the five column vectors may be five column vectors included in a precoding matrix that is formed by multiplying any five column vectors in any one of the foregoing precoding matrices $W_0$, $W_1$, $W_3$, $W_4$, $W_5$, and $W_6$ by a constant coefficient $$\frac{1}{\sqrt{5 \cdot P_{CSI-RS}}}).$$

Alternatively, the five column vectors may be five column vectors in a precoding matrix that is formed by performing row/column transformation on any one of the foregoing precoding matrices $W_0$, $W_1$, $W_3$, $W_4$, $W_5$, and $W_6$ and then performing multiplication by a constant coefficient $$\frac{1}{\sqrt{5 \cdot P_{CSI-RS}}}$$

(or the five column vectors may be five column vectors included in a precoding matrix that is formed by performing row/column transformation on any five column vectors in any one of the foregoing precoding matrices $W_0$, $W_1$, $W_3$, $W_4$, $W_5$, and $W_6$ and then performing multiplication by a constant coefficient $$\frac{1}{\sqrt{5 \cdot P_{CSI-RS}}}).$$

In addition, the quantization solutions and the feedback mechanisms that are enumerated in Case 1 are also applicable to Case 2. To avoid repetition, details are not described herein again.

Case 3: The rank is 8, and the quantity N of antenna port groups=4:

Assuming that a polarization antenna phase factor is c, and an inter-antenna-port-group phase factor is φ, a basic form of the precoding matrix that is in the codebook corresponding to the rank and that is provided in this embodiment of this application may be expressed as:

$$W_2 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \\ \varphi_{21}\begin{pmatrix} b_1 \\ c \cdot b_1 \end{pmatrix} & \varphi_{21}\begin{pmatrix} b_1 \\ -c \cdot b_1 \end{pmatrix} & \varphi_{21}\begin{pmatrix} b_2 \\ c \cdot b_2 \end{pmatrix} & \varphi_{21}\begin{pmatrix} b_2 \\ -c \cdot b_2 \end{pmatrix} & \varphi_{22}\begin{pmatrix} b_1 \\ c \cdot b_1 \end{pmatrix} & \varphi_{22}\begin{pmatrix} b_1 \\ -c \cdot b_1 \end{pmatrix} & \varphi_{22}\begin{pmatrix} b_2 \\ c \cdot b_2 \end{pmatrix} & \varphi_{22}\begin{pmatrix} b_2 \\ -c \cdot b_2 \end{pmatrix} \\ \varphi_{31}\begin{pmatrix} b_1 \\ c \cdot b_1 \end{pmatrix} & \varphi_{31}\begin{pmatrix} b_1 \\ -c \cdot b_1 \end{pmatrix} & \varphi_{31}\begin{pmatrix} b_2 \\ c \cdot b_2 \end{pmatrix} & \varphi_{31}\begin{pmatrix} b_2 \\ -c \cdot b_2 \end{pmatrix} & \varphi_{32}\begin{pmatrix} b_1 \\ c \cdot b_1 \end{pmatrix} & \varphi_{32}\begin{pmatrix} b_1 \\ -c \cdot b_1 \end{pmatrix} & \varphi_{32}\begin{pmatrix} b_2 \\ c \cdot b_2 \end{pmatrix} & \varphi_{32}\begin{pmatrix} b_2 \\ -c \cdot b_2 \end{pmatrix} \end{bmatrix};$$

or a matrix having a row/column transformation relationship with $W_2$.

For example:

The precoding matrix in the codebook corresponding to the rank may be $W_2$, or, a matrix having a row/column transformation relationship with $W_2$, or, a product of $W_2$ and a constant coefficient, where for example, the constant coefficient may be $$\frac{1}{\sqrt{M \cdot P_{CSI-RS}}},$$

or, a product of a constant coefficient and a matrix having a row/column transformation relationship with $W_2$, where for example, the constant coefficient may be $$\frac{1}{\sqrt{M \cdot P_{CSI-RS}}}.$$

To distinguish different values of a same inter-antenna-port-group phase factor, the same inter-antenna-port-group phase factor φ is separately defined as $\varphi_{n1}$ and $\varphi_{n2}$ (n≥1, and n is an integer), and n is used to distinguish different antenna port groups. In $W_2$, $\varphi_{11}$ and $\varphi_{12}$, $\varphi_{21}$ and $\varphi_{22}$, and $\varphi_{31}$ and $\varphi_{32}$ are three groups of inter-antenna-port-group phase factors that are in a one-to-one correspondence with three antenna port groups, and two values of each of any two groups of inter-antenna-port-group phase factors are mutually opposite numbers. In other words, values of any two groups of inter-antenna-port-group phase factors satisfy $\varphi_{i1}=-\varphi_{i2}$, and values of the other group of inter-antenna-port-group phase factors satisfy $\varphi_{i1}=\varphi_{i2}$, where i is 1, 2, or 3. For example, assuming that an absolute value of an inter-antenna-port-group phase factor is 1, values of one group of inter-antenna-port-group phase factors in $W_2$ may be {+1, +1, +1, +1, +1, +1, +1, +1, +1}, and values of the other two groups of inter-antenna-port-group phase factors may both be {+1, +1, +1, +1, −1, −1, −1, −1}.

Alternatively, assuming that a polarization antenna phase factor is c, a basic form of the precoding matrix that is in the codebook corresponding to the rank and that is provided in this embodiment of this application may be expressed as:

$$W_2' = \begin{bmatrix} b_1 & b_1 & b_2 & b_2 & \alpha_{11}\begin{pmatrix} b_1 \\ c \cdot b_1 \end{pmatrix} & \alpha_{21}\begin{pmatrix} b_1 \\ -c \cdot b_1 \end{pmatrix} & \beta_{11}\begin{pmatrix} b_2 \\ c \cdot b_2 \end{pmatrix} & \beta_{21}\begin{pmatrix} b_2 \\ -c \cdot b_2 \end{pmatrix} \\ c \cdot b_1 & -c \cdot b_1 & c \cdot b_2 & -c \cdot b_2 & & & & \\ b_1 & b_1 & b_2 & b_2 & \alpha_{12}\begin{pmatrix} b_1 \\ c \cdot b_1 \end{pmatrix} & \alpha_{22}\begin{pmatrix} b_1 \\ -c \cdot b_1 \end{pmatrix} & \beta_{12}\begin{pmatrix} b_2 \\ c \cdot b_2 \end{pmatrix} & \beta_{22}\begin{pmatrix} b_2 \\ -c \cdot b_2 \end{pmatrix} \\ c \cdot b_1 & -c \cdot b_1 & c \cdot b_2 & -c \cdot b_2 & & & & \\ b_1 & b_1 & b_2 & b_2 & \alpha_{13}\begin{pmatrix} b_1 \\ c \cdot b_1 \end{pmatrix} & \alpha_{23}\begin{pmatrix} b_1 \\ -c \cdot b_1 \end{pmatrix} & \beta_{13}\begin{pmatrix} b_2 \\ c \cdot b_2 \end{pmatrix} & \beta_{23}\begin{pmatrix} b_2 \\ -c \cdot b_2 \end{pmatrix} \\ c \cdot b_1 & -c \cdot b_1 & c \cdot b_2 & -c \cdot b_2 & & & & \\ b_1 & b_1 & b_2 & b_2 & \alpha_{14}\begin{pmatrix} b_1 \\ c \cdot b_1 \end{pmatrix} & \alpha_{24}\begin{pmatrix} b_1 \\ -c \cdot b_1 \end{pmatrix} & \beta_{14}\begin{pmatrix} b_2 \\ c \cdot b_2 \end{pmatrix} & \beta_{24}\begin{pmatrix} b_2 \\ -c \cdot b_2 \end{pmatrix} \\ c \cdot b_1 & -c \cdot b_1 & c \cdot b_2 & -c \cdot b_2 & & & & \end{bmatrix};$$

or a matrix having a row and/or column transformation relationship with $W_2'$.

For example:

The precoding matrix in the codebook corresponding to the rank may be $W_2'$, or, a matrix having a row/column transformation relationship with $W_2'$, or, a product of $W_2'$ and a constant coefficient, where for example, the constant coefficient may be $$\frac{1}{\sqrt{M \cdot P_{CSI-RS}}},$$

or, a product of a constant coefficient and a matrix having a row/column transformation relationship with $W_2'$, where for example, the constant coefficient may be $$\frac{1}{\sqrt{M \cdot P_{CSI-RS}}}.$$

$b_1$ and $b_2$ are the discrete Fourier transform DFT vectors, and c is the polarization antenna phase factor.

Values of two of $\alpha_{11}$, $\alpha_{12}$, $\alpha_{13}$, and $\alpha_{14}$ are +1, and values of the other two are −1.

Values of two of $\alpha_{21}$, $\alpha_{22}$, $\alpha_{23}$, and $\alpha_{24}$ are +1, and values of the other two are −1.

Values of two of $\beta_{11}$, $\beta_{12}$, $\beta_{13}$, and $\beta_{14}$ are +1, and values of the other two are −1.

Values of two of $\beta_{21}$, $\beta_{22}$, $\beta_{23}$, and $\beta_{24}$ are +1, and values of the other two are −1.

Two parameters with a value of 1 and two parameters with a value of −1 may be defined in a protocol, and pre-stored in a corresponding apparatus, or may be configured for the terminal device by using the network device.

Optionally, $\alpha_{11}$, $\alpha_{12}$, $\alpha_{13}$, $\alpha_{14}$, $\alpha_{21}$, $\alpha_{22}$, $\alpha_{23}$, $\alpha_{24}$, $\beta_{11}$, $\beta_{12}$, $\beta_{13}$, $\beta_{14}$, $\beta_{21}$, $\beta_{22}$, $\beta_{23}$, and $\beta_{24}$ may correspond to the inter-antenna-port-group phase factor.

In this embodiment of the present application, the polarization antenna phase factor c may be any value in $\{+1, -1, +j, -j\}$, and the inter-antenna-port-group phase factor may also be any value in $\{+1, -1, +j, -j\}$.

The foregoing precoding matrix $W_2$ may be transformed to obtain:

$$W_7 = \begin{bmatrix} 1 \cdot \begin{pmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\binom{b_1}{c \cdot b_1} & \varphi_{11}\binom{b_1}{-c \cdot b_1} & \varphi_{11}\binom{b_2}{c \cdot b_2} & \varphi_{11}\binom{b_2}{-c \cdot b_2} & -\varphi_{12}\binom{b_1}{c \cdot b_1} & -\varphi_{12}\binom{b_2}{-c \cdot b_1} & -\varphi_{12}\binom{b_2}{c \cdot b_2} & -\varphi_{12}\binom{b_2}{-c \cdot b_2} \end{pmatrix} \\ \varphi_2 \cdot \begin{pmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\binom{b_1}{c \cdot b_1} & \varphi_{11}\binom{b_1}{-c \cdot b_1} & \varphi_{11}\binom{b_2}{c \cdot b_2} & \varphi_{11}\binom{b_2}{-c \cdot b_2} & -\varphi_{12}\binom{b_1}{c \cdot b_1} & -\varphi_{12}\binom{b_2}{-c \cdot b_1} & -\varphi_{12}\binom{b_2}{c \cdot b_2} & -\varphi_{12}\binom{b_2}{-c \cdot b_2} \end{pmatrix} \end{bmatrix}; \text{or}$$

$$W_7 = \begin{bmatrix} 1 \cdot \begin{pmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\binom{b_1}{c \cdot b_1} & \varphi_{11}\binom{b_1}{-c \cdot b_1} & \varphi_{11}\binom{b_2}{c \cdot b_2} & \varphi_{11}\binom{b_2}{-c \cdot b_2} & \varphi_{12}\binom{b_1}{c \cdot b_1} & \varphi_{12}\binom{b_2}{-c \cdot b_1} & \varphi_{12}\binom{b_2}{c \cdot b_2} & \varphi_{12}\binom{b_2}{-c \cdot b_2} \end{pmatrix} \\ \varphi_2 \cdot \begin{pmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\binom{b_1}{c \cdot b_1} & \varphi_{11}\binom{b_1}{-c \cdot b_1} & \varphi_{11}\binom{b_2}{c \cdot b_2} & \varphi_{11}\binom{b_2}{-c \cdot b_2} & \varphi_{12}\binom{b_1}{c \cdot b_1} & \varphi_{12}\binom{b_2}{-c \cdot b_1} & \varphi_{12}\binom{b_2}{c \cdot b_2} & \varphi_{12}\binom{b_2}{-c \cdot b_2} \end{pmatrix} \end{bmatrix}$$

In this case, the precoding matrix in the codebook corresponding to the rank may be or satisfy $W_7$, or, a matrix having a row/column transformation relationship with $W_7$, or, a product of $W_7$ and a constant coefficient, where for example, the constant coefficient may be $$\frac{1}{\sqrt{M \cdot P_{CSI-RS}}},$$

or, a product of a constant coefficient and a matrix having a row/column transformation relationship with $W_7$, where for example, the constant coefficient may be $$\frac{1}{\sqrt{M \cdot P_{CSI-RS}}}.$$

$\varphi_{11}$, $\varphi_{12}$, and $\varphi_2$ are inter-antenna-port-group phase factors, $\varphi_{11} = -\varphi_{12}$, and values of $\varphi_{11}$ and $\varphi_2$ may both be in $\{+1,$ −1, +j, −j$\}$. In addition, $\varphi(p) = e^{j\pi p/2}$, and p is an index of the inter-antenna-port-group phase factor.

With reference to various different quantization solutions and PMI feedback mechanisms that are enumerated in Case 1, similar quantization solutions and corresponding feedback mechanisms may also be used in Case 3 with reference to $W_2$. For example:

(1) The inter-antenna-port-group phase factor is fixed, and the polarization antenna phase factor is quantized.

In this case, the at least one PMI may include a first PMI and a second PMI, the first PMI is used to indicate the beam vector, and the second PMI is used to indicate the polarization antenna phase factor.

Alternatively, the at least one PMI may include an eleventh PMI, and the eleventh PMI corresponds to a plurality of indicator fields (for example, including a plurality of indicator fields). One indicator field is used to indicate the beam vector, and another indicator field is used to indicate the polarization antenna phase factor.

(2) The polarization antenna phase factor is fixed, and the inter-antenna-port-group phase factor is quantized.

The at least one PMI may include a first PMI and a third PMI, the first PMI is used to indicate the beam vector, and the third PMI is used to indicate the inter-antenna-port-group phase factor.

Alternatively, the at least one PMI may include an eleventh PMI, and the eleventh PMI corresponds to a plurality of indicator fields (for example, including a plurality of indicator fields). One indicator field is used to indicate the beam vector, and another indicator field is used to indicate the inter-antenna-port-group phase factor.

(3) Both the polarization antenna phase factor and the inter-antenna-port-group phase factor are quantized.

The at least one PMI may include a first PMI, a second PMI, and a third PMI, the first PMI is used to indicate the beam vector, the second PMI is used to indicate the polarization antenna phase factor, and the third PMI is used to indicate the inter-antenna-port-group phase factor. Alternatively, the at least one PMI may include a first PMI and a fourth PMI, the first PMI is used to indicate the beam vector, and the fourth PMI is used to indicate the polarization antenna phase factor and the inter-antenna-port-group phase factor.

Alternatively, the at least one PMI may include a twelfth PMI and a third PMI. The twelfth PMI corresponds to a plurality of indicator fields. One indicator field is used to indicate the beam vector, and another indicator field is used to indicate the inter-antenna-port-group phase factor. The third PMI is used to indicate the polarization antenna phase factor.

It should be understood that the foregoing enumerated quantization solutions and feedback mechanisms are merely examples for description, and should not constitute any limitation on this application. In this application, another PMI may be fed back on the basis of using the precoding matrix provided in this application and mathematical transformation of the precoding matrix, to implement a same or similar function. For example, the at least one PMI may alternatively include only two PMIs that are respectively used to indicate any two of the three factors: the beam vector, the polarization antenna phase factor, and the inter-antenna-port-group phase factor.

Case 4: The rank <8, and the quantity N of antenna port groups=4.

Various possible precoding matrices when the rank M=8 and the corresponding PMI feedback mechanisms are shown above. When the rank M<8, the precoding matrix in the codebook corresponding to the rank may include M column vectors. The M column vectors are a subset of column vectors in any one of the foregoing precoding matrices $W_2$, $W_2'$ and $W_7$ or, the M column vectors are a subset of column vectors in a matrix having a row/column transformation relationship with any one of the foregoing precoding matrices. Alternatively, the M column vectors are a subset of column vectors in a product matrix of a constant coefficient $$\frac{1}{\sqrt{M \cdot P_{CSI\text{-}RS}}}$$

and any one of the foregoing precoding matrices $W_2$, $W_2'$ and $W_7$. Alternatively, the M column vectors are a subset of column vectors in a product matrix of a constant coefficient $$\frac{1}{\sqrt{M \cdot P_{CSI\text{-}RS}}}$$

and a matrix having a row/column transformation relationship with any one of the foregoing precoding matrices $W_2$, $W_2'$ and $W_7$. Alternatively, the M column vectors are a subset of column vectors satisfying any one of the foregoing precoding matrices $W_2$, $W_2'$ and $W_7$ or, the M column vectors are a subset of column vectors satisfying a matrix having a row/column transformation relationship with any one of the foregoing precoding matrices. Alternatively, the M column vectors are a subset of column vectors satisfying a product matrix of a constant coefficient $$\frac{1}{\sqrt{M \cdot P_{CSI\text{-}RS}}}$$

and any one of the foregoing precoding matrices $W_2$, $W_2'$ and $W_7$. Alternatively, the M column vectors are a subset of column vectors in a product matrix of a constant coefficient $$\frac{1}{\sqrt{M \cdot P_{CSI\text{-}RS}}}$$

and a matrix having a row/column transformation relationship with any one of the foregoing precoding matrices $W_2$, $W_2'$ and $W_7$.

In addition, the quantization solutions and the feedback mechanisms that are enumerated in Case 3 are also applicable to Case 2. To avoid repetition, details are not described herein again.

Case 5: The rank=3 or 4, and the quantity N of antenna port groups (that is, the quantity of antenna panels)=2.

The network device may configure a codebook mode 1 or a codebook mode 2 by using higher layer signaling.

Optionally 4, the codebook mode 1 and the codebook mode 2 may correspond to different forms of the precoding matrix.

When the codebook mode 1 is configured, a basic form of a precoding matrix in a codebook corresponding to a rank of 4 may be expressed as:

$$W_8 = \begin{bmatrix} 1 & 1 & 1 & 1 \\ \varphi_n & -\varphi_n & \varphi_n & -\varphi_n \\ \varphi_{p_1} & \varphi_{p_1} & -\varphi_{p_1} & -\varphi_{p_1} \\ \varphi_n \varphi_{p_1} & -\varphi_n \varphi_{p_1} & \varphi_n(-\varphi_{p_1}) & -\varphi_n(-\varphi_{p_1}) \end{bmatrix}$$

$$= \begin{bmatrix} 1 & 1 & 1 & 1 \\ \varphi_n & -\varphi_n & \varphi_n & -\varphi_n \\ \varphi_{p_1} & \varphi_{p_1} & -\varphi_{p_1} & -\varphi_{p_1} \\ \varphi_n \varphi_{p_1} & -\varphi_n \varphi_{p_1} & -\varphi_n \varphi_{p_1} & \varphi_n \varphi_{p_1} \end{bmatrix};$$

or a matrix having a row and/or column transformation relationship with $W_8$.

For example:

The precoding matrix in the codebook corresponding to the rank may be $W_8$, or, a matrix having a row/column transformation relationship with $W_8$, or, a product of $W_8$ and a constant coefficient, where for example, the constant coefficient may be $$\frac{1}{\sqrt{M \cdot P_{CSI\text{-}RS}}},$$

or, a product of a constant coefficient and a matrix having a row/column transformation relationship with $W_8$, where for example, the constant coefficient may be $$\frac{1}{\sqrt{M \cdot P_{CSI\text{-}RS}}}.$$

An equation after the first equal sign is used for description. $\varphi_n = e^{j\pi n/2}$ is a polarization antenna phase factor, and may be a value in $\{+1, -1, +j, -j\}$, where a value of n is in $\{0, 1, 2, 3\}$. $\varphi_{p_1} = e^{j\pi p_1/2}$ and $-\varphi_{p_1}$ are inter-antenna-port-group phase factors, and $\varphi_{p_1}$ may be a value in $\{+1, -1, +j, -j\}$, where a value of $p_1$ is in $\{0, 1, 2, 3\}$. A precoding matrix in a codebook corresponding to a rank of 3 includes three column vectors, and the three column vectors are a subset of column vectors in the foregoing precoding matrix $W_8$ in the codebook whose rank is 4 or any matrix having a row and/or column transformation relationship with $W_8$, a subset of column vectors in a product matrix of $W_8$, and a constant coefficient, where for example, the constant coefficient may be $$\frac{1}{\sqrt{M \cdot P_{CSI\text{-}RS}}},$$

or a subset of column vectors in a product matrix of a constant coefficient and a matrix having a row and/or column transformation relationship with $W_8$, where for example, the constant coefficient may be $$\frac{1}{\sqrt{M \cdot P_{CSI\text{-}RS}}}.$$

Alternatively, the three column vectors are a subset of column vectors satisfying a precoding matrix $W_8$ in the codebook whose rank is 4 or any matrix having a row and/or column transformation relationship with $W_8$. Alternatively, the three column vectors are a subset of column vectors satisfying a product matrix of $W_8$ and a constant coefficient, where for example, the constant coefficient may be $$\frac{1}{\sqrt{M \cdot P_{CSI\text{-}RS}}}.$$

Alternatively, the three column vectors are a subset of column vectors satisfying a product matrix of a constant coefficient and a matrix having a row and/or column transformation relationship with $W_8$, where for example, the constant coefficient may be $$\frac{1}{\sqrt{M \cdot P_{CSI\text{-}RS}}}.$$

In this case, the at least one PMI may include a thirteenth PMI and a third PMI. The thirteenth PMI may be used to indicate the inter-antenna-port-group phase factor $\varphi_{p_1}$, and the third PMI is used to indicate the polarization antenna phase factor $\varphi_n$. Alternatively, the at least one PMI may include a fourteenth PMI. The fourteenth PMI may be used to indicate $\varphi_{p_1}$ and $\varphi_n$. For example, the fourteenth PMI may include a plurality of indicator fields, one indicator field is used to indicate $\varphi_{p_1}$, and another indicator field is used to indicate $\varphi_n$.

When the codebook mode 2 is configured, a basic form of a precoding matrix in a codebook corresponding to a rank of 4 may be expressed as:

$$W_9 = \begin{bmatrix} 1 & 1 & 1 & 1 \\ \varphi_n & -\varphi_n & \varphi_n & -\varphi_n \\ a_{p_1}b_{n_1} & a_{p_1}b_{n_1} & -a_{p_1}b_{n_1} & -a_{p_1}b_{n_1} \\ a_{p_2}b_{n_2} & -a_{p_2}b_{n_2} & -a_{p_2}b_{n_2} & a_{p_2}b_{n_2} \end{bmatrix};$$

or a matrix having a row/column transformation relationship with $W_9$.

For example:

The precoding matrix in the codebook corresponding to the rank may be $W_9$, or, a matrix having a row/column transformation relationship with $W_9$, or, a product of $W_9$ and a constant coefficient, where for example, the constant coefficient may be $$\frac{1}{\sqrt{M \cdot P_{CSI\text{-}RS}}},$$

or, a product of a constant coefficient and a matrix having a row/column transformation relationship with $W_9$, where for example, the constant coefficient may be $$\frac{1}{\sqrt{M \cdot P_{CSI\text{-}RS}}}.$$

$\varphi_n = e^{j\pi n/2}$ is a polarization antenna phase factor, and may be a value in $\{+1, -1, +j, -j\}$, where a value of n is in $\{0, 1, 2, 3\}$. A value of $a_{p_1}$ is $e^{j\pi/4}e^{j\pi p_1/2}$, and a value of $p_1$ is in $\{0, 1, 2, 3\}$. A value of $a_{p_2}$ is $e^{j\pi/4}e^{j\pi p_2/2}$, and a value of $p_2$ is in $\{0, 1, 2, 3\}$. A value of $b_{n_1}$ is $e^{-j\pi/4}e^{j\pi n_1/2}$, and a value of $n_1$ is in $\{0, 1\}$. A value of $b_{n_2}$ is $e^{-j\pi/4}e^{j\pi n_2/2}$, and a value of $n_2$ is in $\{0, 1\}$. A precoding matrix in a codebook corresponding to a rank of 3 includes three column vectors, and the three column vectors are a subset of column vectors in the foregoing precoding matrix $W_9$ in the codebook whose rank is 4 or any matrix having a row/column transformation relationship with $W_9$, a subset of column vectors in a product matrix of $W_9$ and a constant coefficient, where for example, the constant coefficient may be $$\frac{1}{\sqrt{M \cdot P_{CSI\text{-}RS}}},$$

or a subset of column vectors in a product matrix of a constant coefficient and a matrix having a row/column transformation relationship with $W_9$, where for example, the constant coefficient may be $$\frac{1}{\sqrt{M \cdot P_{CSI\text{-}RS}}}.$$

Alternatively, the three column vectors are a subset of column vectors satisfying the foregoing precoding matrix $W_9$ in the codebook whose rank is 4 or any matrix having a row/column transformation relationship with $W_9$. Alternatively, the three column vectors are a subset of column vectors satisfying a product matrix of $W_9$ and a constant coefficient, where for example, the constant coefficient may be $$\frac{1}{\sqrt{M \cdot P_{CSI\text{-}RS}}}.$$

Alternatively, the three column vectors are a subset of column vectors satisfying a product matrix of a constant coefficient and a matrix having a row/column transformation relationship with $W_9$, where for example, the constant coefficient may be $$\frac{1}{\sqrt{M \cdot P_{CSI\text{-}RS}}}.$$

Case 6: The rank=3 or 4, and the quantity N of antenna port groups (that is, the quantity of antenna panels)=4.

Optionally, the network device may configure the codebook mode 1 by using higher layer signaling.

A basic form of a precoding matrix in a codebook corresponding to a rank of 4 may be expressed as:

$$W_{10} = \begin{bmatrix} 1 & 1 & 1 & 1 \\ \varphi_n & -\varphi_n & \varphi_n & -\varphi_n \\ \varphi_{p_1} & \varphi_{p_1} & \varphi_{p_1} & \varphi_{p_1} \\ \varphi_{p_1}\varphi_n & \varphi_{p_1}(-\varphi_n) & \varphi_{p_1}\varphi_n & \varphi_{p_1}(-\varphi_n) \\ \varphi_{p_2} & \varphi_{p_2} & -\varphi_{p_2} & -\varphi_{p_2} \\ \varphi_{p_2}\varphi_n & \varphi_{p_2}(-\varphi_n) & (-\varphi_{p_2})\varphi_n & (-\varphi_{p_2})(-\varphi_n) \\ \varphi_{p_3} & \varphi_{p_3} & -\varphi_{p_3} & -\varphi_{p_3} \\ \varphi_{p_3}\varphi_n & \varphi_{p_3}(-\varphi_n) & (-\varphi_{p_3})\varphi_n & (-\varphi_{p_3})(-\varphi_n) \end{bmatrix} = \begin{bmatrix} 1 & 1 & 1 & 1 \\ \varphi_n & -\varphi_n & \varphi_n & -\varphi_n \\ \varphi_{p_1} & \varphi_{p_1} & \varphi_{p_1} & \varphi_{p_1} \\ \varphi_{p_1}\varphi_n & -\varphi_{p_1}\varphi_n & \varphi_{p_1}\varphi_n & -\varphi_{p_1}\varphi_n \\ \varphi_{p_2} & \varphi_{p_2} & -\varphi_{p_2} & -\varphi_{p_2} \\ \varphi_{p_2}\varphi_n & -\varphi_{p_2}\varphi_n & -\varphi_{p_2}\varphi_n & \varphi_{p_2}\varphi_n \\ \varphi_{p_3} & \varphi_{p_3} & -\varphi_{p_3} & -\varphi_{p_3} \\ \varphi_{p_3}\varphi_n & -\varphi_{p_3}\varphi_n & -\varphi_{p_3}\varphi_n & \varphi_{p_3}\varphi_n \end{bmatrix}$$

In this case, the at least one PMI may include a fifteenth PMI and a sixteenth PMI. The fifteenth PMI may be used to indicate $a_{p_1}$ and $$a_{p_2}.$$

For example, the fifteenth PMI may include a plurality of indicator fields, one indicator field is used to indicate $$a_{p_1},$$

and another indicator field is used to indicate $$a_{p_2}.$$

The sixteenth PMI is used to indicate the polarization antenna phase factor $\varphi_n$, $$b_{n_1},$$

and $$b_{n_2}.$$

For example, the sixteenth PMI may include a plurality of indicator fields, where one indicator field is used to indicate $\varphi_n$, one indicator field is used to indicate $b_{n_1}$, and another indicator field is used to indicate $$b_{n_2}.$$

An equation after the first equal sign is used for description. $\varphi_n = e^{j\pi n/2}$ is a polarization antenna phase factor, and may be a value in $\{+1, -1, +j, -j\}$, a value of n is in $\{0, 1, 2, 3\}$, $\varphi_{p_1} = e^{j\pi p_1/2}$ is an inter-antenna-port-group phase factor, $\varphi_{p_1}$ may be a value in $\{+1, -1, +j, -j\}$, a value of $p_1$ is in $\{0, 1, 2, 3\}$, $\varphi_{p_2} = e^{j\pi p_2/2}$ is an inter-antenna-port-group phase factor, $-\varphi_{p_2}$ is an inter-antenna-port-group phase factor, $\varphi_{p_2}$ and may be a value in $\{+1, -1, +j, -j\}$, a value of $p_2$ is in $\{0, 1, 2, 3\}$, $\varphi_{p_3} = e^{j\pi p_3/2}$ is an inter-antenna-port-group phase factor, $-\varphi_{p_3}$ is an inter-antenna-port-group phase factor, $\varphi_{p_3}$ may be a value in $\{+1, -1, +j, -j\}$, and a value of $p_3$ is in $\{0, 1, 2, 3\}$. A precoding matrix in a codebook corresponding to a rank of 3 includes three column vectors. The three column vectors are a subset of column vectors in the foregoing precoding matrix $W_{10}$ in the codebook whose rank is 4 or any matrix having a row/column transformation relationship with $W_{10}$, a subset of column vectors in a product matrix of $W_{10}$ and a constant coefficient, where for example, the constant coefficient may be $$\frac{1}{\sqrt{M \cdot P_{CSI\text{-}RS}}},$$

or a subset of column vectors in a product matrix of a constant coefficient and a matrix having a row/column transformation relationship with $W_{10}$, where for example, the constant coefficient may be $$\frac{1}{\sqrt{M \cdot P_{CSI\text{-}RS}}}.$$

Alternatively, the three column vectors are a subset of column vectors satisfying the foregoing precoding matrix $W_{10}$ in the codebook whose rank is 4 or any matrix having a row/column transformation relationship with $W_{10}$. Alternatively, the three column vectors are a subset of column vectors satisfying a product matrix of $W_{10}$ and a constant coefficient, where for example, the constant coefficient may be $$\frac{1}{\sqrt{M \cdot P_{CSI\text{-}RS}}}.$$

Alternatively, the three column vectors are a subset of column vectors satisfying a product matrix of a constant coefficient and a matrix having a row/column transformation relationship with $W_{10}$, where for example, the constant coefficient may be $$\frac{1}{\sqrt{M \cdot P_{CSI\text{-}RS}}}.$$

Alternatively, a basic form of a precoding matrix in a codebook corresponding to a rank of 4 may be expressed as:

$$W_{10} = \begin{bmatrix} 1 & 1 & \alpha_1\begin{pmatrix}1\\\varphi_n\end{pmatrix} & \beta_1\begin{pmatrix}1\\-\varphi_n\end{pmatrix} \\ \varphi_n & -\varphi_n & & \\ \varphi_{p_1} & \varphi_{p_1} & \alpha_2\varphi_{p_1}\begin{pmatrix}1\\\varphi_n\end{pmatrix} & \beta_2\varphi_{p_1}\begin{pmatrix}1\\-\varphi_n\end{pmatrix} \\ \varphi_{p_1}\varphi_n & \varphi_{p_1}(-\varphi_n) & & \\ \varphi_{p_2} & \varphi_{p_2} & \alpha_3\varphi_{p_2}\begin{pmatrix}1\\\varphi_n\end{pmatrix} & \beta_3\varphi_{p_2}\begin{pmatrix}1\\-\varphi_n\end{pmatrix} \\ \varphi_{p_2}\varphi_n & \varphi_{p_2}(-\varphi_n) & & \\ \varphi_{p_3} & \varphi_{p_3} & \alpha_4\varphi_{p_3}\begin{pmatrix}1\\\varphi_n\end{pmatrix} & \beta_4\varphi_{p_3}\begin{pmatrix}1\\-\varphi_n\end{pmatrix} \\ \varphi_{p_3}\varphi_n & \varphi_{p_3}(-\varphi_n) & & \end{bmatrix} =$$

$$\begin{bmatrix} 1 & 1 & \alpha_1\begin{pmatrix}1\\\varphi_n\end{pmatrix} & \beta_1\begin{pmatrix}1\\-\varphi_n\end{pmatrix} \\ \varphi_n & -\varphi_n & & \\ \varphi_{p_1} & \varphi_{p_1} & \alpha_2\begin{pmatrix}\varphi_{p_1}\\\varphi_{p_1}\varphi_n\end{pmatrix} & \beta_2\begin{pmatrix}\varphi_{p_1}\\-\varphi_{p_1}\varphi_n\end{pmatrix} \\ \varphi_{p_1}\varphi_n & -\varphi_{p_1}\varphi_n & & \\ \varphi_{p_2} & \varphi_{p_2} & \alpha_3\begin{pmatrix}\varphi_{p_2}\\\varphi_{p_2}\varphi_n\end{pmatrix} & \beta_3\begin{pmatrix}\varphi_{p_2}\\-\varphi_{p_2}\varphi_n\end{pmatrix} \\ \varphi_{p_2}\varphi_n & -\varphi_{p_2}\varphi_n & & \\ \varphi_{p_3} & \varphi_{p_3} & \alpha_4\begin{pmatrix}\varphi_{p_3}\\\varphi_{p_3}\varphi_n\end{pmatrix} & \beta_4\begin{pmatrix}\varphi_{p_3}\\-\varphi_{p_3}\varphi_n\end{pmatrix} \\ \varphi_{p_3}\varphi_n & -\varphi_{p_3}\varphi_n & & \end{bmatrix};$$

a matrix having a row/column transformation relationship with $W_{10}$.

For example:

The precoding matrix in the codebook corresponding to the rank may be $W_{10}$, or, a matrix having a row/column transformation relationship with $W_{10}$, or, a product of $W_{10}$ and a constant coefficient, where for example, the constant coefficient may be $$\frac{1}{\sqrt{M \cdot P_{CSI\text{-}RS}}},$$

or, a product of a constant coefficient and a matrix having a row/column transformation relationship with $W_{10}$, where for example, the constant coefficient may be $$\frac{1}{\sqrt{M \cdot P_{CSI\text{-}RS}}}.$$

Values of two of $\alpha_1$, $\alpha_2$, $\alpha_3$, and $\alpha_4$ are +1, and values of the other two are −1. Values of two of $\beta_1$, $\beta_2$, $\beta_3$, and $\beta_4$ are +1, and values of the other two are −1.

Two parameters with a value of 1 and two parameters with a value of −1 may be defined in a protocol, and pre-stored in a corresponding apparatus, or may be configured for the terminal device by using the network device.

An equation after the first equal sign is used for description. $\varphi_n = e^{j\pi n/2}$ is a polarization antenna phase factor, and may be a value in $\{+1, -1, +j, -j\}$, where a value of n is in $\{0, 1, 2, 3\}$. $\varphi_{p_1} = e^{j\pi p_1/2}$ is an inter-antenna-port-group phase factor, $\alpha_2\varphi_{p_1}$ is an inter-antenna-port-group phase factor, $\beta_2\varphi_{p_1}$ is an inter-antenna-port-group phase factor, and $\varphi_{p_1}$ may be a value in $\{+1, -1, +j, -j\}$, where a value of $p_1$ is in $\{0, 1, 2, 3\}$. $\varphi_{p_2} = e^{j\pi p_2/2}$ is an inter-antenna-port-group phase factor, $\alpha_3\varphi_{p_2}$ is an inter-antenna-port-group phase factor, $\beta_3\varphi_{p_2}$ is an inter-antenna-port-group phase factor, $\varphi_{p_2}$ may be a value in $\{+1, -1, +j, -j\}$ where a value of $p_2$ is in $\{0, 1, 2, 3\}$. $\varphi_{p_3} = e^{j\pi p_3/2}$ is an inter-antenna-port-group phase factor, $\alpha_4\varphi_{p_3}$ is an inter-antenna-port-group phase factor, $\beta_4\varphi_{p_3}$ is an inter-antenna-port-group phase factor, and $\varphi_{p_3}$ may be a value in $\{+1, -1, +j, -j\}$, where a value of $p_3$ is in $\{0, 1, 2, 3\}$. A precoding matrix in a codebook corresponding to a rank of 3 includes three column vectors. The three column vectors are a subset of column vectors in the foregoing precoding matrix $W_{10}$ in the codebook whose rank is 4 or any matrix having a row/column transformation relationship with $W_{10}$, a subset of column vectors in a product matrix of $W_{10}$ and a constant coefficient, where for example, the constant coefficient may be $$\frac{1}{\sqrt{M \cdot P_{CSI\text{-}RS}}},$$

or a subset of column vectors in a product matrix of a constant coefficient and a matrix having a row/column transformation relationship with $W_{10}$, where for example, the constant coefficient may be $$\frac{1}{\sqrt{M \cdot P_{CSI\text{-}RS}}}.$$

Alternatively, the three column vectors are a subset of column vectors satisfying the foregoing precoding matrix $W_{10}$ in the codebook whose rank is 4 or any matrix having a row/column transformation relationship with $W_{10}$. Alternatively, the three column vectors are a subset of column vectors satisfying a product matrix of $W_{10}$ and a constant coefficient, where for example, the constant coefficient may be $$\frac{1}{\sqrt{M \cdot P_{CSI\text{-}RS}}}.$$

Alternatively, the three column vectors are a subset of column vectors satisfying a product matrix of a constant coefficient and a matrix having a row/column transformation relationship with $W_{10}$, where for example, the constant coefficient may be $$\frac{1}{\sqrt{M \cdot P_{CSI-RS}}}.$$

In Case 6, the at least one PMI may include a seventeenth PMI and a third PMI. The seventeenth PMI may be used to indicate $\varphi_{p_1}$, $\varphi_{p_2}$ and $\varphi_{p_3}$. For example, the seventeenth PMI may include a plurality of indicator fields, where one indicator field is used to indicate $\varphi_{p_1}$, another indicator field is used to indicate $\varphi_{p_2}$, and still another indicator field is used to indicate $\varphi_{p_3}$. The third PMI is used to indicate the polarization antenna phase factor $\varphi_n$. Alternatively, the at least one PMI may include an eighteenth PMI. The eighteenth PMI may be used to indicate $\varphi_{p_1}$, $\varphi_{p_2}$, $\varphi_{p_3}$, and $\varphi_n$. For example, the eighteenth PMI may include a plurality of indicator fields, one indicator field is used to indicate $\varphi_{p_1}$, another indicator field is used to indicate $\varphi_{p_2}$, still another indicator field is used to indicate $\varphi_{p_3}$, and yet another indicator field is used to indicate $\varphi_n$.

Therefore, in this embodiment of this application, the network device and the terminal device determine CSI based on the precoding matrix that is in a high order codebook and that is provided in this application, so that a data stream can be transmitted at a larger quantity of layers, thereby helping improve a rate of MIMO transmission, improving a data transmission capability of a communications system, and improving a throughput.

It should be understood that the foregoing enumerated precoding matrices are merely possible forms of the precoding matrix provided in this application, and should not constitute any limitation on this application. A precoding matrix obtained by performing row/column transformation or other mathematical transformation on the form of the precoding matrix provided in this application shall fall within the protection scope of this application.

It should be noted that in a possible implementation, the network device and the terminal device may store one or more of the following:

(a) a parameter used to obtain any precoding matrix enumerated in the foregoing implementations, where the any precoding matrix may be obtained based on the parameter, and for example, the parameter may include, but is not limited to, the codebook configuration parameter and the like that are enumerated above;

(b) any precoding matrix enumerated in the foregoing implementations;

(c) a matrix obtained by extending any precoding matrix enumerated in the foregoing implementations;

(d) a matrix obtained by performing row/column transformation on any precoding matrix enumerated in the foregoing implementations;

(e) a matrix obtained by extending a matrix that is obtained by performing row/column transformation on any precoding matrix enumerated in the foregoing implementations; and (f) a codebook, where the codebook includes the matrix in at least one of (b), (c), (d), or (e).

It should be understood that in this application, the row/column transformation is row transformation, column transformation, or row transformation and column transformation.

Storage in this application may be storage in one or more memories. The one or more memories may be separately disposed, or may be integrated into an encoder or a decoder, a processor, or a communications apparatus. Alternatively, a part of the one or more memories may be separately disposed, and the other part may be integrated into a decoder, a processor, or a communications apparatus. A type of the memory may be a storage medium in any form. This is not limited in this application.

Figure 5:
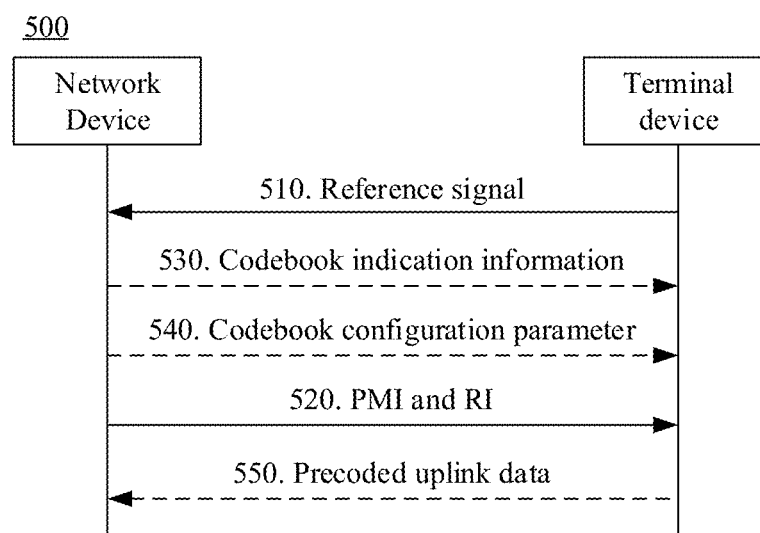
FIG. 5 is a schematic flowchart of a communication method according to another embodiment of this application.

The foregoing describes in detail the communication method in the embodiments of this application with reference to FIG. 4, and the following describes in detail a communication method in another embodiment of the present application with reference to FIG. 5.

FIG. 5 is a schematic flowchart, shown from a perspective of device interaction, of a communication method according to an embodiment of this application. Specifically, FIG. 5 shows a scenario of uplink channel measurement. As shown in the figure, the method shown in FIG. 5 may include step 510 to step 550.

Step 510. A terminal device sends a reference signal to a network device.

Step 520. The network device sends at least one PMI and an RI to the terminal device based on the reference signal.

Optionally, the method 500 further includes: Step 530. The network device sends codebook indication information to the terminal device.

Optionally, the method 500 further includes: Step 540. The network device sends codebook configuration information to the terminal device.

Optionally, the method 500 further includes: Step 550: The terminal device precodes to-be-sent uplink data based on the PMI and the RI, and sends the precoded uplink data.

It should be understood that the steps in the method 500 are similar to the steps in the method 400. To avoid repetition, details are not described herein again.

Numbers of the foregoing steps do not limit a chronological order of the steps, and the chronological order of the steps may be determined based on implementation of the solution. For example, step 530 may be performed before step 540, or may be performed after step 540.

Various forms of the precoding matrix that are described above with reference to FIG. 4 are also applicable to the uplink channel measurement. To avoid repetition, details are not described herein again with reference to the precoding matrix.

In addition, in this embodiment of this application, after obtaining CSI of an uplink channel through measurement, the network device may further determine CSI of a downlink channel based on channel reciprocity (for example, in time division duplex (time division duplexing, TDD)). This is not particularly limited in this application.

Therefore, in this embodiment of this application, the network device and the terminal device determine the CSI based on the precoding matrix that is in a high order codebook and that is provided in this application, so that a data stream can be transmitted at a larger quantity of layers, thereby helping improve a rate of MIMO transmission, improving a data transmission capability of a communications system, and improving a throughput.

Figure 6:
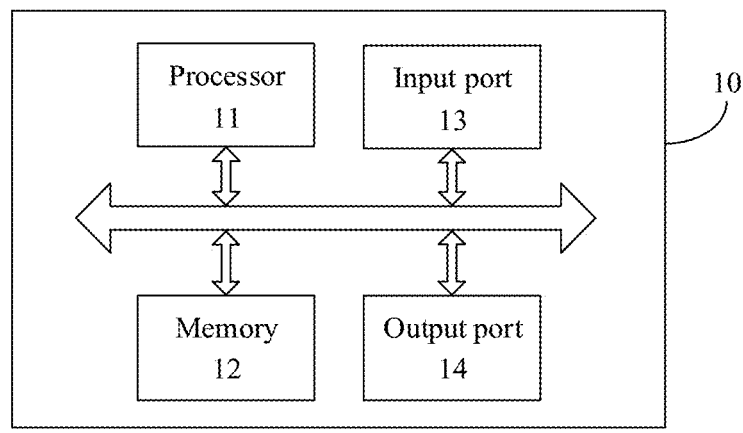
FIG. 6 is a schematic diagram of a communications apparatus according to an embodiment of this application.

According to the foregoing method, FIG. 6 is a schematic diagram 1 of a communications apparatus 10 according to an embodiment of this application. As shown in FIG. 6, the apparatus 10 may be a terminal device, or may be a chip or a circuit, for example, a chip or a circuit that may be disposed in a terminal device. The terminal device may correspond to the terminal device in the foregoing method.

The apparatus 10 may include a processor 11 and a memory 12. The memory 12 is configured to store an instruction, and the processor 11 is configured to execute the instruction stored in the memory 12, to enable the apparatus 10 to implement the steps in the corresponding method in FIG. 4 or FIG. 5.

Further, the apparatus 10 may further include an input port 13 and an output port 14. Further, the processor 11, the memory 12, the input port 13, and the output port 14 may communicate with each other by using an internal connection path, and transmit a control and/or data signal. The memory 12 is configured to store a computer program. The processor 11 may be configured to invoke the computer program from the memory 12 and run the computer program, to control the input port 13 to receive a signal, and control the output port 14 to send a signal, thereby completing the steps performed by the terminal device in the foregoing method. The memory 12 may be integrated into the processor 11, or may be separate from the processor 11.

Optionally, if the apparatus 10 is a terminal device, the input port 13 is a receiver, and the output port 14 is a transmitter. The receiver and the transmitter may be a same physical entity or different physical entities. When being the same physical entity, the input port 13 and the output port 14 may be collectively referred to as a transceiver.

Optionally, if the apparatus 10 is a chip or a circuit, the input port 13 is an input interface, and the output port 14 is an output interface.

In an implementation, it may be considered that functions of the input port 13 and the output port 14 are implemented by using a transceiver circuit or a dedicated transceiver chip. It may be considered that the processor 11 is implemented by using a dedicated processing chip, processing circuit, or processor, or a universal chip.

In another implementation, it may be considered that the terminal device provided in this embodiment of this application is implemented in a form of a general-purpose computer. That is, program code for implementing the functions of the processor 11, the input port 13, and the output port 14 is stored in the memory 12, and a general-purpose processor executes the code in the memory 12 to implement the functions of the processor 11, the input port 13, and the output port 14.

For concepts, explanations, and detailed descriptions for the apparatus 10 that are related to the technical solution provided in this embodiment of this application and other steps, refer to the descriptions of the content in the foregoing method or other embodiments. Details are not described herein again.

Figure 7:
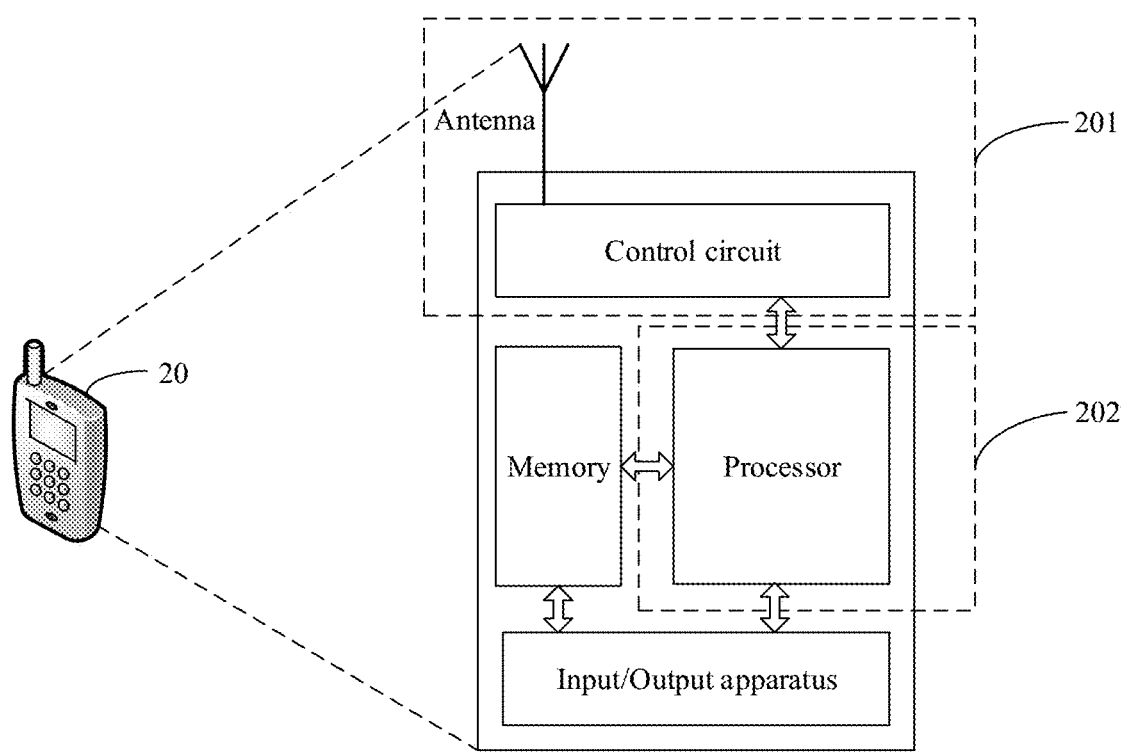
FIG. 7 is a schematic structural diagram of a terminal device according to an embodiment of this application.

FIG. 7 is a schematic structural diagram of a terminal device 20 according to this application. The terminal device 20 may be applied to the system shown in FIG. 1. For ease of description, FIG. 7 shows only main components of the terminal device. As shown in FIG. 7, the terminal device 20 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the action described in the embodiment of the foregoing method for transmitting indication of a precoding matrix. The memory is mainly configured to store the software program and data, for example, store the codebook described in the foregoing embodiment. The control circuit is mainly configured to perform conversion between a baseband signal and a radio frequency signal, and process the radio frequency signal. A combination of the control circuit and the antenna may also be referred to as a transceiver that is mainly configured to receive and send a radio frequency signal in an electromagnetic wave form. The input/output apparatus such as a touchscreen, a display screen, or a keyboard is mainly configured to: receive data entered by a user, and output data to the user.

After the terminal device is powered on, the processor may read the software program in the memory, explain and execute an instruction of the software program, and process the data of the software program. When data needs to be wirelessly sent, the processor performs baseband processing on the to-be-sent data, and outputs a baseband signal to a radio frequency circuit. After performing radio frequency processing on the baseband signal, the radio frequency circuit sends a radio frequency signal outward in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data and processes the data.

A person skilled in the art may understand that, for ease of description, FIG. 7 shows only one memory and only one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data, and the central processing unit is mainly configured to: control the entire terminal device, execute the software program, and process the data of the software program. The processor in FIG. 7 integrates functions of the baseband processor and the central processing unit. A person skilled in the art may understand that the baseband processor and the central processing unit may be separate processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

For example, in this embodiment of this application, the antenna having receiving and sending functions and the control circuit may be considered as a transceiver unit 201 of the terminal device 20, and the processor having a processing function may be considered as a processing unit 202 of the terminal device 20. As shown in FIG. 7, the terminal device 20 includes the transceiver unit 201 and the processing unit 202. The transceiver unit may also be referred to as a transceiver, a transmitting/receiving device, a transceiver apparatus, or the like. Optionally, a component configured to implement a receiving function in the transceiver unit 201 may be considered as a receiving unit, and a component configured to implement a sending function in the transceiver unit 201 may be considered as a sending unit. In other words, the transceiver unit 201 includes a receiving unit and a sending unit. For example, the receiving unit may also be referred to as a receiver, a receiving device, a receiver circuit, or the like, and the sending unit may be referred to as a transmitter, a transmitting device, a transmitter circuit, or the like.

Figure 8:
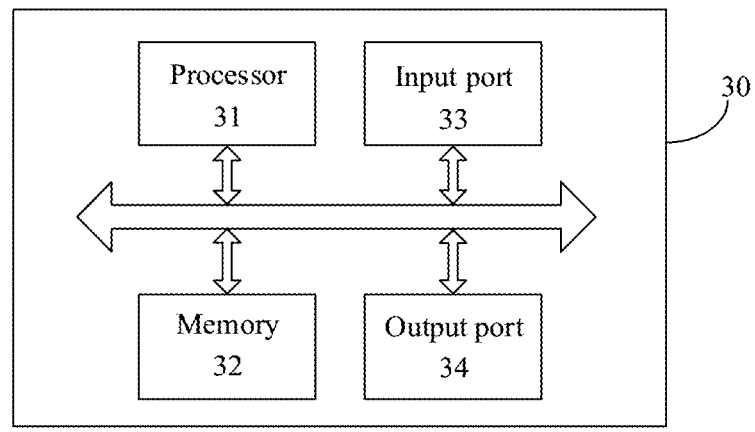
FIG. 8 is another schematic diagram of a communications apparatus according to an embodiment of this application.

According to the foregoing method, FIG. 8 is a schematic diagram 2 of a communications apparatus 30 according to an embodiment of this application. As shown in FIG. 8, the apparatus 30 may be a network device, or may be a chip or a circuit, for example, a chip or a circuit that may be disposed in a network device. The network device corresponds to the network device in the foregoing method.

The apparatus 30 may include a processor 31 and a memory 32. The memory 32 is configured to store an instruction, and the processor 31 is configured to execute the instruction stored in the memory 32, to enable the apparatus 30 to implement the steps in the corresponding method in FIG. 4 or FIG. 5.

Further, the apparatus 30 may further include an input port 33 and an output port 34. Still further, the processor 31, the memory 32, the input port 33, and the output port 34 may communicate with each other by using an internal connection path, and transmit a control and/or data signal. The memory 32 is configured to store a computer program. The processor 31 may be configured to invoke the computer program from the memory 32 and run the computer program, to control the input port 33 to receive a signal, and control the output port 34 to send a signal, thereby completing the steps performed by the network device in the foregoing method. The memory 32 may be integrated into the processor 31, or may be separate from the processor 31.

The input port 33 is controlled to receive a signal, and the output port 34 is controlled to send a signal, thereby implementing the steps performed by the network device in the foregoing method. The memory 32 may be integrated into the processor 31, or may be separate from the processor 31.

Optionally, if the apparatus 30 is a network device, the input port 33 is a receiver, and the output port 34 is a transmitter. The receiver and the transmitter may be a same physical entity or different physical entities. When being the same physical entity, the input port 33 and the output port 34 may be collectively referred to as a transceiver.

Optionally, if the apparatus 30 is a chip or a circuit, the input port 33 is an input interface, and the output port 34 is an output interface.

Optionally, if the apparatus 30 is a chip or a circuit, the apparatus 30 may not include the memory 32. The processor 31 may read an instruction (a program or code) in a memory outside the chip, to implement the functions in the corresponding method in FIG. 4 or FIG. 5.

In an implementation, it may be considered that functions of the input port 33 and the output port 34 are implemented by using a transceiver circuit or a dedicated transceiver chip. It may be considered that the processor 31 is implemented by using a dedicated processing chip, processing circuit, or processor, or a universal chip.

In another implementation, it may be considered that the network device provided in this embodiment of this application is implemented by using a general-purpose computer. That is, program code for implementing the functions of the processor 31, the input port 33, and the output port 34 is stored in the memory, and a general-purpose processor executes the code in the memory to implement the functions of the processor 31, the input port 33, and the output port 34.

For concepts, explanations, and detailed descriptions for the apparatus 30 that are related to the technical solution provided in this embodiment of this application and other steps, refer to the descriptions of the content in the foregoing method or other embodiments. Details are not described herein again.

Figure 9:
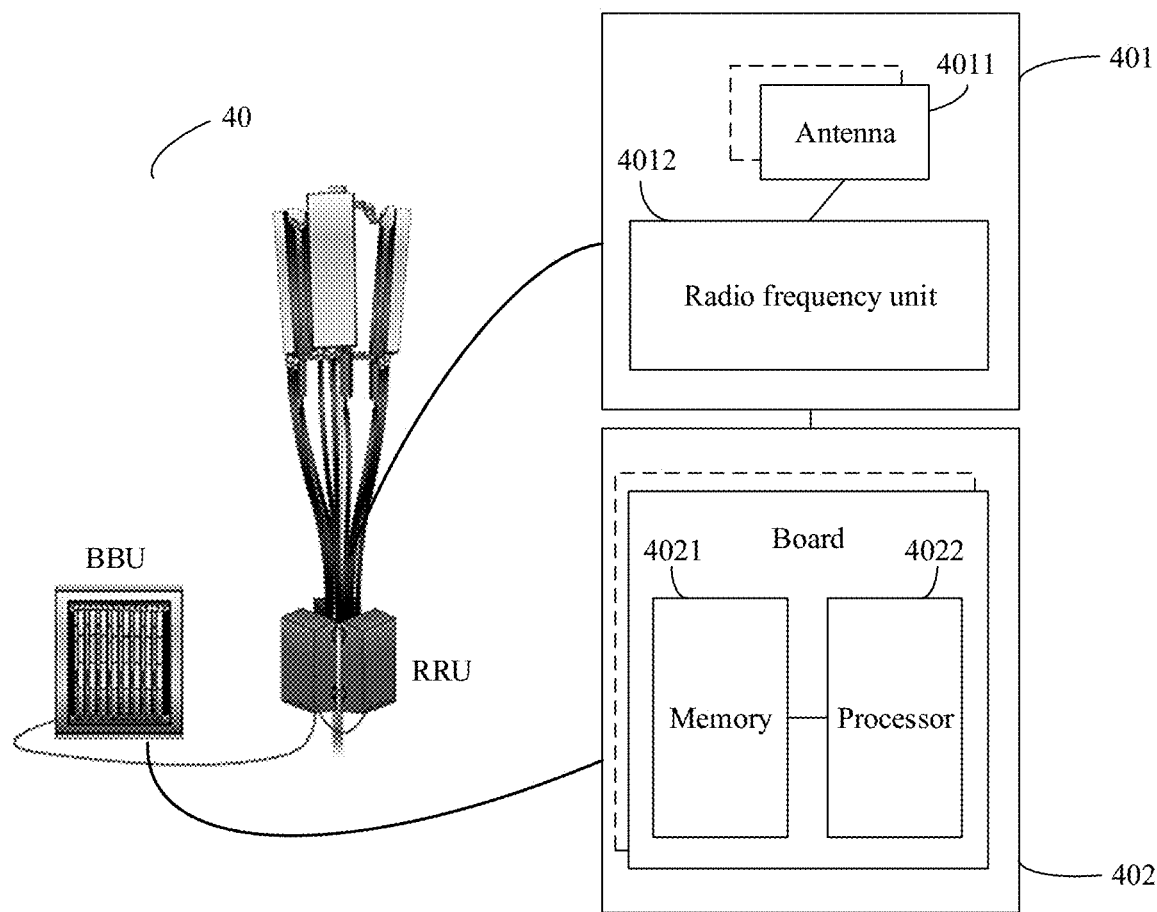
FIG. 9 is a schematic structural diagram of a network device according to an embodiment of this application.

FIG. 9 is a schematic structural diagram of a network device according to an embodiment of this application. The network device may be configured to implement the functions of the network device in the foregoing method. For example, FIG. 9 may be a schematic structural diagram of a base station. As shown in FIG. 9, the base station may be applied to the system shown in FIG. 1. The base station 40 includes one or more radio frequency units, such as a remote radio unit (remote radio unit, RRU) 401 and one or more baseband units (baseband unit, BBU) (also referred to as digital units (digital unit, DU)) 402. The RRU 401 may be referred to as a transceiver unit, a transceiver, a transceiver circuit, a transmitting/receiving device, or the like, and may include at least one antenna 4011 and a radio frequency unit 4012. The RRU 401 is mainly configured to receive and send a radio frequency signal and perform conversion between a radio frequency signal and a baseband signal, for example, configured to send the signaling message in the foregoing embodiments to a terminal device. The BBU 402 is mainly configured to: perform baseband processing, control the base station, and so on. The RRU 401 and the BBU 402 may be physically disposed together, or may be physically disposed separately, to be specific, may be on a distributed base station.

The BBU 402 is a control center of the base station, may also be referred to as a processing unit, and is mainly configured to implement a baseband processing function, for example, channel coding, multiplexing, modulation, and spreading. For example, the BBU (the processing unit) 402 may be configured to control the base station 40 to perform the operation procedure related to the network device in the foregoing method embodiments.

In an example, the BBU 402 may include one or more boards, and a plurality of boards may together support a radio access network (for example, an LTE system or a 5G system) of a single access standard, or may separately support radio access networks of different access standards. The BBU 402 further includes a memory 4021 and a processor 4022. The memory 4021 is configured to store a necessary instruction and necessary data. For example, the memory 4021 stores the codebook and the like in the foregoing embodiments. The processor 4022 is configured to control the base station to perform a necessary action. For example, the processor 4022 is configured to control the base station to perform the operation procedure related to the network device in the foregoing method embodiments. The memory 4021 and the processor 4022 may serve one or more boards. In other words, a memory and a processor may be disposed on each board. Alternatively, a plurality of boards may share a same memory and a same processor. In addition, each board may further be provided with a necessary circuit.

In a possible implementation, with development of a system-on-chip (System-on-chip, SoC) technology, all or some functions of the components 402 and 401 may be implemented by using the SoC technology, for example, implemented by using one base station function chip. The base station function chip integrates components such as a processor, a memory, and an antenna interface. A program of a base station-related function is stored in the memory. The processor executes the program to implement the base station-related function. Optionally, the base station function chip can further read a memory outside the chip to implement the base station-related function.

It should be understood that the structure of the base station as an example shown in FIG. 9 is merely a possible form, but should not constitute any limitation on this embodiment of this application. In this application, a base station structure in another form that may appear in the future is not excluded.

According to the method provided in the embodiments of this application, an embodiment of this application further provides a communications system. The system includes the foregoing network device and one or more terminal devices.

It should be understood that, the processor in the embodiments of this application may be a central processing unit (central processing unit, CPU), or may be another general purpose processor, a digital signal processor (digital signal processor, DSP), an application-specific integrated circuit (application specific integrated circuit, ASIC), a field programmable gate array (field programmable gate array, FPGA), or another programmable logical device, discrete gate or transistor logical device, discrete hardware component, or the like. The general purpose processor may be a microprocessor, or the processor may be any conventional processor or the like.

It should further be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean chronological orders of execution in various embodiments of this application. The chronological orders of execution of the processes should be determined according to functions and internal logic of the processes, and should not be construed as any limitation on the implementation processes of the embodiments of this application.

A person of ordinary skill in the art may be aware that, the examples of units and algorithm steps that are described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications apparatus, comprising:
a memory, configured to store a computer program; and
a processor, configured to execute the computer program stored in the memory, to cause the apparatus to perform the following:
receiving a reference signal used for channel measurement; and
sending at least one precoding matrix indicator PMI and a rank indication RI based on the reference signal, wherein the PMI is used to indicate a precoding matrix in a codebook corresponding to the RI, the precoding matrix in the codebook comprises a plurality of matrices in a one-to-one correspondence with a plurality of antenna port groups, a matrix corresponding to one antenna port group or each of at least two antenna port groups has two different inter-antenna-port-group phase factors, and any two column vectors in the precoding matrix are orthogonal to each other,
wherein a quantity of columns of the precoding matrix corresponds to a rank, a quantity of rows of the precoding matrix corresponds to a total quantity of antenna ports, the rank is M, a quantity of antenna port groups is N, matrices that correspond to N/2 antenna port groups and that are in the precoding matrix comprise a first column vector set and a second column vector set, and an inter-antenna-port-group phase factor of the first column vector set and an inter-antenna-port-group phase factor of the second column vector set are opposite numbers, wherein M is an integer greater than 1, and N is an even number greater than or equal to 2.

2. The apparatus according to claim 1, wherein each antenna port group comprises $2N_1N_2$ CSI-RS antenna ports, $N_1$ represents a quantity of horizontal CSI-RS antenna ports, $N_2$ represents a quantity of vertical CSI-RS antenna ports, and the total quantity of antenna ports comprised in the N antenna port groups is $P_{CSI-RS}=2NN_1N_2$, wherein N is an even number greater than or equal to 2, $N_1$ is an integer greater than or equal to 1, and $N_2$ is an integer greater than or equal to 1.

3. The apparatus according to claim 1, wherein M is 8, N is 2, and the precoding matrix in the codebook corresponding to the rank indication is:

$$W_1 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \end{bmatrix};$$

or a matrix having a row and/or column transformation relationship with $W_1$; or
a product of $W_1$ and a constant coefficient; or
a product of a constant coefficient and a matrix having a row and/or column transformation relationship with $W_1$, wherein
$b_1$ and $b_2$ are discrete Fourier transform DFT vectors, c is a polarization antenna phase factor, $\varphi_{11}$ and $\varphi_{12}$ are two inter-antenna-port-group phase factors corresponding to one antenna port group, and $\varphi_{11}=-\varphi_{12}$.

4. The apparatus according to claim 1, wherein M<8, N is 2, and the precoding matrix in the codebook corresponding to the rank indication comprises NI column vectors, wherein the M column vectors are a subset of column vectors in the following precoding matrix:

$$W_1 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \end{bmatrix};$$

or a matrix having a row and/or column transformation relationship with $W_1$; or
a product of $W_1$ and a constant coefficient; or
a product of a constant coefficient and a matrix having a row and/or column transformation relationship with $W_1$, wherein
$b_1$ and $b_2$ are discrete Fourier transform DFT vectors, c is a polarization antenna phase factor, $\varphi_{11}$ and $\varphi_{12}$ are two inter-antenna-port-group phase factors corresponding to one antenna port group, and $\varphi_{11}=-\varphi_{12}$.

5. The apparatus according to claim 1, wherein M is 8, N is 4, and the precoding matrix in the codebook corresponding to the rank indication is:

$$W_2 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \\ \varphi_{21}\begin{pmatrix} b_1 \\ c \cdot b_1 \end{pmatrix} & \varphi_{21}\begin{pmatrix} b_1 \\ -c \cdot b_1 \end{pmatrix} & \varphi_{21}\begin{pmatrix} b_2 \\ c \cdot b_2 \end{pmatrix} & \varphi_{21}\begin{pmatrix} b_2 \\ -c \cdot b_2 \end{pmatrix} & \varphi_{22}\begin{pmatrix} b_1 \\ c \cdot b_1 \end{pmatrix} & \varphi_{22}\begin{pmatrix} b_1 \\ -c \cdot b_1 \end{pmatrix} & \varphi_{22}\begin{pmatrix} b_2 \\ c \cdot b_2 \end{pmatrix} & \varphi_{22}\begin{pmatrix} b_2 \\ -c \cdot b_2 \end{pmatrix} \\ \varphi_{31}\begin{pmatrix} b_1 \\ c \cdot b_1 \end{pmatrix} & \varphi_{31}\begin{pmatrix} b_1 \\ -c \cdot b_1 \end{pmatrix} & \varphi_{31}\begin{pmatrix} b_2 \\ c \cdot b_2 \end{pmatrix} & \varphi_{31}\begin{pmatrix} b_2 \\ -c \cdot b_2 \end{pmatrix} & \varphi_{32}\begin{pmatrix} b_1 \\ c \cdot b_1 \end{pmatrix} & \varphi_{32}\begin{pmatrix} b_1 \\ -c \cdot b_1 \end{pmatrix} & \varphi_{32}\begin{pmatrix} b_2 \\ c \cdot b_2 \end{pmatrix} & \varphi_{32}\begin{pmatrix} b_2 \\ -c \cdot b_2 \end{pmatrix} \end{bmatrix};$$

or
- a matrix having a row and/or column transformation relationship with $W_2$; or
- a product of $W_2$ and a constant coefficient; or
- a product of a constant coefficient and a matrix having a row and/or column transformation relationship with $W_2$, wherein
- $b_1$ and $b_2$ are DFT vectors, c is a polarization antenna phase factor, $\varphi_{11}$ and $\varphi_{12}$, $\varphi_{21}$ and $\varphi_{22}$, and $\varphi_{31}$ and $\varphi_{32}$ are three groups of inter-antenna-port-group phase factors in a one-to-one correspondence with three antenna port groups, values of two groups of inter-antenna-port-group phase factors satisfy $\varphi_{i1}=-\varphi_{i2}$, and values of the other group of inter-antenna-port-group phase factors satisfy $\varphi_{i1}=-\varphi_{i2}$, wherein i is 1, 2, or 3.

6. The apparatus according to claim 1, wherein M<8, N is 4, and the precoding matrix in the codebook corresponding to the rank indication comprises M column vectors, wherein the M column vectors are a subset of column vectors in the following precoding matrix:

$$W_2 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \\ \varphi_{21}\begin{pmatrix} b_1 \\ c \cdot b_1 \end{pmatrix} & \varphi_{21}\begin{pmatrix} b_1 \\ -c \cdot b_1 \end{pmatrix} & \varphi_{21}\begin{pmatrix} b_2 \\ c \cdot b_2 \end{pmatrix} & \varphi_{21}\begin{pmatrix} b_2 \\ -c \cdot b_2 \end{pmatrix} & \varphi_{22}\begin{pmatrix} b_1 \\ c \cdot b_1 \end{pmatrix} & \varphi_{22}\begin{pmatrix} b_1 \\ -c \cdot b_1 \end{pmatrix} & \varphi_{22}\begin{pmatrix} b_2 \\ c \cdot b_2 \end{pmatrix} & \varphi_{22}\begin{pmatrix} b_2 \\ -c \cdot b_2 \end{pmatrix} \\ \varphi_{31}\begin{pmatrix} b_1 \\ c \cdot b_1 \end{pmatrix} & \varphi_{31}\begin{pmatrix} b_1 \\ -c \cdot b_1 \end{pmatrix} & \varphi_{31}\begin{pmatrix} b_2 \\ c \cdot b_2 \end{pmatrix} & \varphi_{31}\begin{pmatrix} b_2 \\ -c \cdot b_2 \end{pmatrix} & \varphi_{32}\begin{pmatrix} b_1 \\ c \cdot b_1 \end{pmatrix} & \varphi_{32}\begin{pmatrix} b_1 \\ -c \cdot b_1 \end{pmatrix} & \varphi_{32}\begin{pmatrix} b_2 \\ c \cdot b_2 \end{pmatrix} & \varphi_{32}\begin{pmatrix} b_2 \\ -c \cdot b_2 \end{pmatrix} \end{bmatrix};$$

or
- a matrix having a row and/or column transformation relationship with $W_2$; or
- a product of $W_2$ and a constant coefficient; or
- a product of a constant coefficient and a matrix having a row and/or column transformation relationship with $W_2$, wherein
- $b_1$ and $b_2$ are DFT vectors, c is a polarization antenna phase factor, $\varphi_{11}$ and $\varphi_{12}$, $\varphi_{21}$ and $\varphi_{22}$, and $\varphi_{31}$ and $\varphi_{32}$ are three groups of inter-antenna-port-group phase factors in a one-to-one correspondence with three antenna port groups, values of two groups of inter-antenna-port-group phase factors satisfy $\varphi_{i1}=\varphi_{i2}$, and values of the other group of inter-antenna-port-group phase factors satisfy $\varphi_{i1}=\varphi_{i2}$, wherein i is 1, 2, or 3.

7. The apparatus according to claim 1, wherein the at least one PMI comprises a first PMI and a second PMI and/or a third PMI, the first PMI is used to indicate the DFT vector, the second PMI is used to indicate the inter-antenna-port-group phase factor, and the third PMI is used to indicate the polarization antenna phase factor.

8. The apparatus according to claim 1, wherein the at least one PMI comprises a first PMI and a fourth PMI, the first PMI is used to indicate the DFT vector, and the fourth PMI is used to indicate the inter-antenna-port-group phase factor and the polarization antenna phase factor.

9. The apparatus according to claim 1, wherein M is 8, N is 2, and the precoding matrix in the codebook corresponding to the rank is:

$$W_3 = \begin{bmatrix} z_1 \cdot b_1 & z_1 \cdot b_1 & z_1 \cdot b_2 & z_1 \cdot b_2 & z_1 \cdot b_1 & z_1 \cdot b_1 & z_1 \cdot b_2 & z_1 \cdot b_2 \\ z_2 \cdot b_1 & -z_2 \cdot b_1 & z_2 \cdot b_2 & -z_2 \cdot b_2 & z_2 \cdot b_1 & -z_2 \cdot b_1 & z_2 \cdot b_2 & -z_2 \cdot b_2 \\ z_3 \cdot b_1 & z_3 \cdot b_1 & z_3 \cdot b_2 & z_3 \cdot b_2 & -z_3 \cdot b_1 & -z_3 \cdot b_1 & -z_3 \cdot b_2 & -z_3 \cdot b_2 \\ z_4 \cdot b_1 & -z_4 \cdot b_1 & z_4 \cdot b_2 & -z_4 \cdot b_2 & -z_4 \cdot b_1 & z_4 \cdot b_1 & -z_4 \cdot b_2 & z_4 \cdot b_2 \end{bmatrix};$$

or
- a matrix having a row and/or column transformation relationship with $W_3$, wherein
- $b_1$ and $b_2$ are DFT vectors, $z_1=1$, $z_2$ is a polarization antenna phase factor, $z_3$ and $-z_3$ are inter-antenna-port-group phase factors, and $z_4$ is a product of the polarization antenna phase factor and the inter-antenna-port-group phase factor.

10. The apparatus according to claim 1, wherein M<8, N is 2, and the precoding matrix in the codebook corresponding to the rank comprises M column vectors, wherein the M column vectors are a subset of column vectors in the following precoding matrix:

$$W_3 = \begin{bmatrix} z_1 \cdot b_1 & z_1 \cdot b_1 & z_1 \cdot b_2 & z_1 \cdot b_2 & z_1 \cdot b_1 & z_1 \cdot b_1 & z_1 \cdot b_2 & z_1 \cdot b_2 \\ z_2 \cdot b_1 & -z_2 \cdot b_1 & z_2 \cdot b_2 & -z_2 \cdot b_2 & z_2 \cdot b_1 & -z_2 \cdot b_1 & z_2 \cdot b_2 & -z_2 \cdot b_2 \\ z_3 \cdot b_1 & z_3 \cdot b_1 & z_3 \cdot b_2 & z_3 \cdot b_2 & -z_3 \cdot b_1 & -z_3 \cdot b_1 & -z_3 \cdot b_2 & -z_3 \cdot b_2 \\ z_4 \cdot b_1 & -z_4 \cdot b_1 & z_4 \cdot b_2 & -z_4 \cdot b_2 & -z_4 \cdot b_1 & z_4 \cdot b_1 & -z_4 \cdot b_2 & z_4 \cdot b_2 \end{bmatrix};$$

or
a matrix having a row and/or column transformation relationship with $W_3$, wherein
$b_1$ and $b_2$ are DFT vectors, $z_1=1$, $z_2$ is a polarization antenna phase factor, $z_3$ and $-z_3$ are inter-antenna-port-group phase factors, and $z_4$ is a product of the polarization antenna phase factor and the inter-antenna-port-group phase factor.

11. The apparatus according to claim 10, wherein a value of $z_k$ is in {+1, −1, +j, −j}, and a value of k is 2, 3, or 4.

12. The apparatus according to claim 11, wherein the at least one PMI comprises a first PMI and a fifth PMI, the first PMI is used to indicate the DFT vector, and the fifth PMI is used to indicate at least one of $z_2$, $z_3$, or $z_4$.

13. The apparatus according to claim 10, wherein $z_m = x_m * y_m$, $x_m$ and $y_m$ are two components of $z_m$, and a value of m is one or more of 2, 3, and 4.

14. The apparatus according to claim 13, wherein the at least one PMI comprises a first PMI, a sixth PMI, and a seventh PMI, the first PMI is used to indicate the DFT vector, the sixth PMI is used to indicate $x_m$, and the seventh PMI is used to indicate $y_m$, or,
the at least one PMI comprises a seventh PMI and an eighth PMI, the seventh PMI is used to indicate $y_m$, and the eighth PMI is used to indicate the DFT vector and $x_m$.

15. The apparatus according to claim 1, wherein the processor is further configured to execute the computer program stored in the memory, to cause the apparatus to perform the following:
receiving codebook indication information, wherein the codebook indication information is used to indicate a used codebook type.

16. The apparatus according to claim 15, wherein the codebook type comprises a single-panel codebook or a multi-panel codebook.

17. The apparatus according to claim 1, wherein the processor is further configured to execute the computer program stored in the memory, to cause the apparatus to perform the following:

receiving a codebook configuration parameter, wherein the codebook configuration parameter comprises any one of the following:
the quantity of antenna port groups and a quantity of antenna ports comprised in each antenna port group;
the quantity of antenna port groups and the total quantity of antenna ports;
the total quantity of antenna ports and a quantity of antenna ports comprised in each antenna port group; or
a quantity of horizontal antenna ports comprised in each antenna port group and a quantity of vertical antenna ports comprised in each antenna port group and the quantity of antenna port groups.

18. A communication apparatus, comprising:
a memory, configured to store a computer program; and
a processor, configured to execute the computer program stored in the memory, to cause the apparatus to perform the following:
sending a reference signal used for channel sounding; and
receiving a precoding matrix indicator PMI and a rank indication RI, wherein the PMI and the RI are related to the reference signal, the PMI is used to indicate a precoding matrix in a codebook corresponding to the RI, the precoding matrix in the codebook comprises a plurality of matrices in a one-to-one correspondence with a plurality of antenna port groups, a matrix corresponding to one antenna port group or each of at least two antenna port groups has two different inter-antenna-port-group phase factors, and any two column vectors in the precoding matrix are orthogonal to each other,
wherein a quantity of columns of the precoding matrix corresponds to a rank, a quantity of rows of the precoding matrix corresponds to a total quantity of antenna ports, the rank is m, a quantity of antenna port groups is n, matrices that correspond to n/2 antenna port groups and that are in the precoding matrix comprise a first column vector set and a second column vector set, and an inter-antenna-port-group phase factor of the first column vector set and an inter-antenna-port-group phase factor of the second column vector set are opposite numbers, wherein m is an integer greater than 1, and n is an even number greater than or equal to 2.

19. The apparatus according to claim 18, wherein M is 8, N is 2, and the precoding matrix in the codebook corresponding to the rank indication is:

$$W_1 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \end{bmatrix};$$

or
a matrix having a row and/or column transformation relationship with $W_1$; or
a product of $W_1$ and a constant coefficient; or a product of a constant coefficient and a matrix having a row and/or column transformation relationship with $W_1$, wherein $b_1$ and $b_2$ are discrete Fourier transform DFT vectors, c is a polarization antenna phase factor, $\varphi_{11}$ and $\varphi_{12}$ are two inter-antenna-port-group phase factors corresponding to one antenna port group, and $\varphi_{11} = -\varphi_{12}$.

20. The apparatus according to claim 18, wherein M<8, N is 2, and the precoding matrix in the codebook corresponding to the rank indication comprises M column vectors, wherein the M column vectors are a subset of column vectors in the following precoding matrix:

$$W_1 = \begin{bmatrix} b_1 & b_1 & b_2 & b_2 & b_1 & b_1 & b_2 & b_2 \\ c \cdot b_1 & -c \cdot b_1 & c \cdot b_2 & -c \cdot b_2 & c \cdot b_1 & -c \cdot b_1 & c \cdot b_2 & -c \cdot b_2 \\ \varphi_{11}\begin{pmatrix} b_1 \\ c \cdot b_1 \end{pmatrix} & \varphi_{11}\begin{pmatrix} b_1 \\ -c \cdot b_1 \end{pmatrix} & \varphi_{11}\begin{pmatrix} b_2 \\ c \cdot b_2 \end{pmatrix} & \varphi_{11}\begin{pmatrix} b_2 \\ -c \cdot b_2 \end{pmatrix} & \varphi_{12}\begin{pmatrix} b_1 \\ c \cdot b_1 \end{pmatrix} & \varphi_{12}\begin{pmatrix} b_1 \\ -c \cdot b_1 \end{pmatrix} & \varphi_{12}\begin{pmatrix} b_2 \\ c \cdot b_2 \end{pmatrix} & \varphi_{12}\begin{pmatrix} b_2 \\ -c \cdot b_2 \end{pmatrix} \end{bmatrix};$$

or a matrix having a row and/or column transformation relationship with $W_1$; or a product of $W_1$ and a constant coefficient; or a product of a constant coefficient and a matrix having a row and/or column transformation relationship with $W_1$, wherein $b_1$ and $b_2$ are discrete Fourier transform DFT vectors, c is a polarization antenna phase factor, $\varphi_{11}$ and $\varphi_{12}$ are two inter-antenna-port-group phase factors corresponding to one antenna port group, and $\varphi_{11} = -\varphi_{12}$.

\* \* \* \* \*